US011017231B2

(12) United States Patent
Petill et al.

(10) Patent No.: US 11,017,231 B2
(45) Date of Patent: May 25, 2021

(54) SEMANTICALLY TAGGED VIRTUAL AND PHYSICAL OBJECTS

(71) Applicant: Microsoft Technology Licensing, LLC, Redmond, WA (US)

(72) Inventors: Scott D. Petill, Seattle, WA (US); Robert James Jarrett, Seattle, WA (US); Jacob A. Bomgardner, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/508,213

(22) Filed: Jul. 10, 2019

(65) Prior Publication Data
US 2021/0012113 A1    Jan. 14, 2021

(51) Int. Cl.
| G06K 9/00 | (2006.01) |
| G06F 16/58 | (2019.01) |
| G06T 7/70 | (2017.01) |
| G06F 40/44 | (2020.01) |
| G02B 27/01 | (2006.01) |
| G06T 19/00 | (2011.01) |

(52) U.S. Cl.
CPC ..... *G06K 9/00671* (2013.01); *G02B 27/0101* (2013.01); *G06F 16/5866* (2019.01); *G06F 40/44* (2020.01); *G06T 7/70* (2017.01); *G06T 19/006* (2013.01); *G02B 2027/014* (2013.01)

(58) Field of Classification Search
None
See application file for complete search history.

(56) References Cited

U.S. PATENT DOCUMENTS

| 2013/0332066 A1* | 12/2013 | Jeung | ................. G01C 21/3602 |
| | | | 701/420 |
| 2014/0249722 A1* | 9/2014 | Hegemann | ............. G08G 1/166 |
| | | | 701/41 |

(Continued)

OTHER PUBLICATIONS

Vincent, James, "HoloLens 2 will have a Custom AI Chip Designed by Microsoft", Retrieved from https://www.theverge.com/2017/7/24/16018558/microsoft-ai-coprocessor-hololens-hpu, Jul. 24, 2017, 5 Pages.

(Continued)

*Primary Examiner* — Saptarshi Mazumder
(74) *Attorney, Agent, or Firm* — Alleman Hall Creasman & Tuttle LLP

(57) ABSTRACT

A head mounted display device is provided that includes a display device, a camera device, an input device, and a processor. The processor is configured to store a database of physical objects and virtual objects that have been associated with one or more semantic tags. The processor is further configured to receive a natural language input from a user via the input device and perform semantic processing on the natural language input to determine a user specified operation and identify one or more semantic tags indicated by the natural language input. The processor is further configured to select a target virtual object and a target physical object based on the identified one or more semantic tags, perform the determined user specified operation on the target virtual object based on the target physical object, and display the target virtual object at a physical location associated with the target physical object.

20 Claims, 17 Drawing Sheets

(56) References Cited

U.S. PATENT DOCUMENTS

| | | | |
|---|---|---|---|
| 2016/0189427 A1* | 6/2016 | Wu | G06F 3/016 |
| | | | 345/633 |
| 2016/0246384 A1* | 8/2016 | Mullins | G06F 3/011 |
| 2017/0162177 A1* | 6/2017 | Lebeck | G06F 21/6218 |
| 2018/0189568 A1* | 7/2018 | Powderly | G06T 19/006 |
| 2018/0299952 A1* | 10/2018 | Koker | G06F 3/016 |
| 2018/0307303 A1 | 10/2018 | Powderly et al. | |
| 2019/0087712 A1* | 3/2019 | Sundaresan | G06N 3/0454 |
| 2019/0172261 A1 | 6/2019 | Alt et al. | |
| 2019/0391726 A1* | 12/2019 | Iskandar | G06F 3/012 |

OTHER PUBLICATIONS

"International Search Report and Written Opinion Issued in PCT Application No. PCT/US2020/036742", dated Sep. 9, 2020, 34 Pages.

* cited by examiner

SEMANTICALLY TAGGED VIRTUAL AND PHYSICAL OBJECTS

BACKGROUND

Head mounted display devices may implement augmented reality configurations where virtual objects are displayed to a user superimposed on a physical environment being viewed by the user. Typically, the user may interact with these virtual objects using gesture inputs that are detected by the head mounted display device. The result of these interactions with the virtual objects may be displayed to the user in real-time via the display.

SUMMARY

A head mounted display device is provided according to one aspect of the present disclosure. The head mounted display device may include a display device configured to display virtual objects at locations in a physical environment, a camera device configured to capture images of the physical environment, an input device configured to receive a user input, and a processor. The processor may be configured to store a database of physical objects and virtual objects that have been associated with one or more semantic tags. The processor may be further configured to receive a natural language input from a user via the input device and perform semantic processing on the natural language input to determine a user specified operation and identify one or more semantic tags indicated by the natural language input. The processor may be further configured to select a target virtual object and a target physical object from the physical objects and virtual objects in the database based on the identified one or more semantic tags. The processor may be further configured to perform the determined user specified operation on the target virtual object based on the target physical object, and display the target virtual object at a physical location associated with the target physical object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 at (B) shows an example surface mesh generated by the computer device of FIG. 1. FIG. 5 at (C) shows an example object segmentation of the surface mesh generated by the computer device of FIG. 1. FIG. 5 at (D) shows an example object recognition for the physical table object captured by computer device of FIG. 1.

DETAILED DESCRIPTION

Augmented and virtual reality head mounted display (HMD) devices typically may compute and maintain continuously updating representations of a physical environment being imaged by camera of the HMD device. For example, these devices may perform a surface reconstruction process that produces and updates a mesh representation of the physical environment. These devices may also be display holograms at world-locked locations within the physical environment based on the computed representations of the physical environment.

Typically, to move a virtual object from one location to another in the physical environment with these devices, the user "grabs" onto the virtual object via a gesture or grasping input, and carries the virtual object to a new location. However, these techniques to move virtual objects can become cumbersome for the user when moving a virtual object to different rooms and when attempting to move multiple virtual objects. For example, the user may have to move back and forth between two rooms several times in order to move multiple different virtual objects to the new location.

Figure 1:
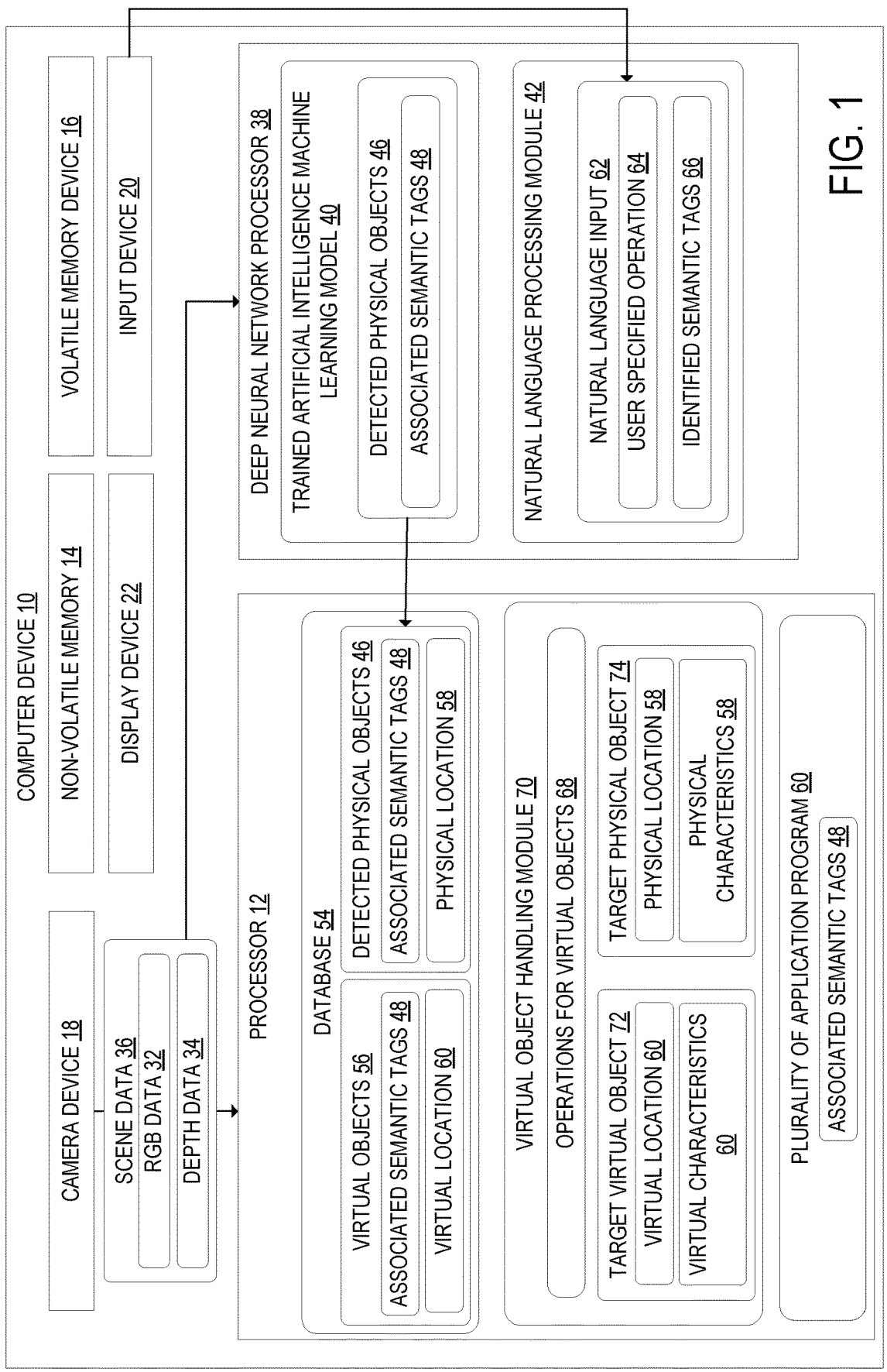
FIG. 1 shows a schematic view of a computer device for performing user specified operations on virtual objects based on natural language inputs from a user, according to one embodiment of the present disclosure.

To address these issues, FIG. 1 illustrates a computer device 10 that is capable of performing user specified operations on virtual objects based on natural language inputs from a user. The computer device 10 may take the form of an HMD device, a desktop computer device, a mobile computer device, or another suitable form. The computer device 10 comprises a processor 12, a non-volatile memory device 14, a volatile memory device 16, a camera device 18, one or more input devices 20, and a display device 22. The camera device 18 may include a red-green-blue (RGB) camera and a depth camera configured to take RGB and depth images of a physical environment in front of the camera device 18. In one example, the camera device 18 may include one or more cameras located in different positions in the physical environment. In an HMD device example, the camera device 18 may take the form of outward facing cameras on the HMD device.

The one or more input devices 20 may include, for example, a microphone device, a keyboard and mouse, a gesture input device (e.g. gestures captured by the camera device 18), accelerometer and inertial sensor devices on an HMD device, etc. In one example, the display device 22 may take the form of a projection display device. In an HMD device example, the display device 22 may take the form of a near-eye display device integrated with the HMD device. It should be appreciated that the computer device 10 and display device 22 may take other suitable form factors.

Figure 2:
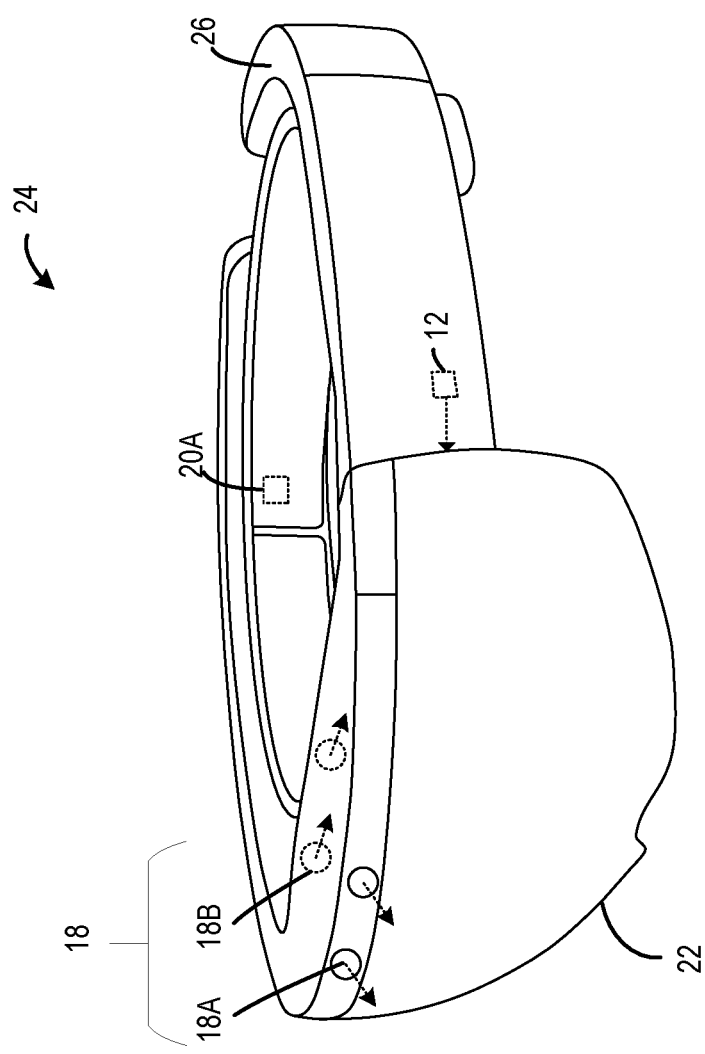
FIG. 2 shows a side perspective view of the computer device of FIG. 1 in the form of a head mounted display (HMD) device.

FIG. 2 illustrates an example computer device 10 in the form of an HMD device 24. The HMD device 24 may be worn by a user according to an example of the present disclosure. In other examples, an HMD device may take other suitable forms in which an at least partially see-through display is supported in front of a viewer's eye or eyes in an augmented reality HMD device configuration.

In the example of FIG. 2, the HMD device 24 includes a frame 26 that wraps around the head of the user to position the display device 22, which takes the form of a near-eye display in this example, close to the user's eyes. The frame supports additional components of the HMD device 24, such as, for example, the processor 12 and camera devices 18. The processor 12 includes logic and associated computer memory configured to provide image signals to the display device 22, to receive sensory signals from camera devices 18, input devices 20, and to enact various control processes described herein.

Any suitable display technology and configuration may be used to display images via the display device 22. For example, in a non-augmented reality configuration, the display device 22 may be a non-see-through Light-Emitting Diode (LED) display, a Liquid Crystal Display (LCD), or any other suitable type of non-see-through display. In an augmented reality configuration, the display device 22 may be configured to enable a wearer of the HMD device 24 to view a physical, real-world object in the physical environment through one or more partially transparent pixels displaying virtual object representations. For example, the display device 22 may include image-producing elements such as, for example, a see-through Organic Light-Emitting Diode (OLED) display.

As another example, the HMD device 24 may include a light modulator on an edge of the display device 14. In this example, the display device 22 may serve as a light guide for delivering light from the light modulator to the eyes of a wearer. In other examples, the display device 22 may utilize a liquid crystal on silicon (LCOS) display.

The input devices 20 may include various sensors and related systems to provide information to the processor 12. Such sensors may include an inertial measurement unit (IMU) 20A. The camera device 18 may include one or more outward facing camera devices 18A, and one or more inward facing camera devices 18B. The one or more inward facing camera devices 18B may be configured to acquire image data in the form of gaze tracking data from a wearer's eyes.

The one or more outward facing camera devices 18A may be configured to capture and/or measure physical environment attributes of the physical environment in which the HMD device 24 is located. In one example, the one or more outward facing camera devices 18A may include a visible-light camera or RBG camera configured to collect a visible-light image of a physical space. Further, the one or more outward facing camera devices 18A may include a depth camera configured to collect a depth image of a physical space. More particularly, in one example the depth camera is an infrared time-of-flight depth camera. In another example, the depth camera is an infrared structured light depth camera.

Data from the outward facing camera devices 18A may be used by the processor 12 to generate and/or update a three-dimensional (3D) model of the physical environment. Data from the outward facing camera devices 18B may be used by the processor 12 to identify surfaces of the physical environment and/or measure one or more surface parameters of the physical environment. The processor 12 may execute instructions to generate/update virtual scenes displayed on display device 22, identify surfaces of the physical environment, and recognize objects based on the identified surfaces in the physical environment, as will be described in more detail below.

In augmented reality configurations of HMD device 24, the position and/or orientation of the HMD device 24 relative to the physical environment may be assessed so that augmented-reality images may be accurately displayed in desired real-world locations with desired orientations. As noted above, the processor 12 may execute instructions to generate a 3D model of the physical environment including surface reconstruction information, which may include generating a geometric representation, such as a geometric mesh, of the physical environment that may be used to identify surfaces and boundaries between objects, and recognize those objects in the physical environment based on a trained artificial intelligence machine learning model.

In both augmented reality and non-augmented reality configurations of HMD device 24, the IMU 20A of HMD device 10 may be configured to provide position and/or orientation data of the HMD device 24 to the processor 12. In one implementation, the IMU 20A may be configured as a three-axis or three-degree of freedom (3DOF) position sensor system. This example position sensor system may, for example, include three gyroscopes to indicate or measure a change in orientation of the HMD device 24 within 3D space about three orthogonal axes (e.g., roll, pitch, and yaw). The orientation derived from the sensor signals of the IMU may be used to display, via the display device 22, one or more holographic images with a realistic and stable position and orientation.

In another example, the IMU 20A may be configured as a six-axis or six-degree of freedom (6DOF) position sensor system. Such a configuration may include three accelerometers and three gyroscopes to indicate or measure a change in location of the HMD device 24 along three orthogonal spatial axes (e.g., x, y, and z) and a change in device orientation about three orthogonal rotation axes (e.g., yaw, pitch, and roll). In some implementations, position and orientation data from the outward facing camera devices 18A and the IMU 20A may be used in conjunction to determine a position and orientation (or 6DOF pose) of the HMD device 24.

In some examples, a 6DOF position sensor system may be used to display holographic representations in a world-locked manner. A world-locked holographic representation appears to be fixed relative to one or more real world objects viewable through the HMD device 24, thereby enabling a wearer of the HMD device 24 to move around a real world physical environment while perceiving a world-locked hologram as remaining stationary in a fixed location and orientation relative to the one or more real world objects in the physical environment.

Figure 3:
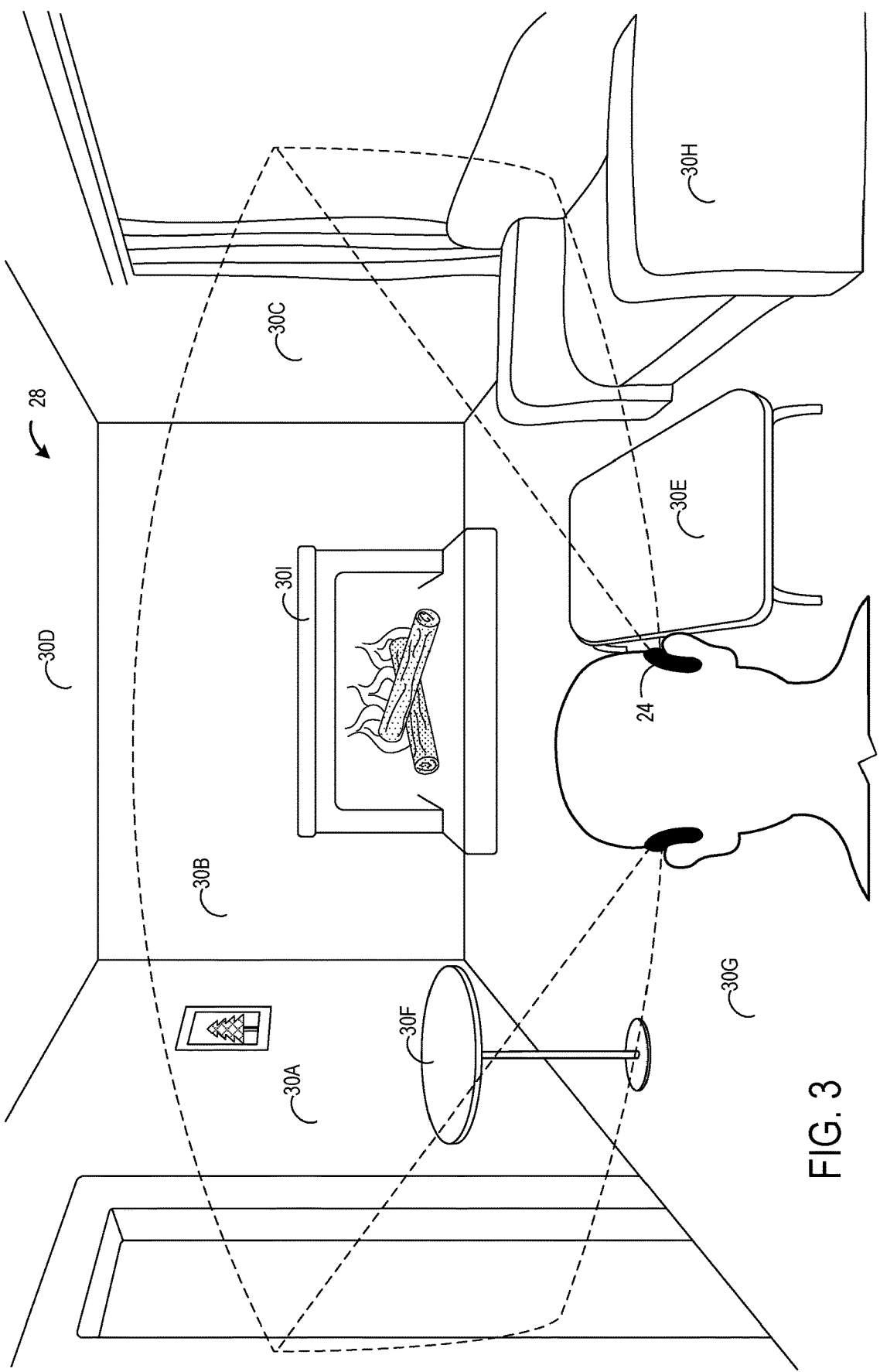
FIG. 3 shows an example physical environment captured by the computer device of FIG. 1.

FIG. 3 illustrates an example physical environment 28 in the form of a room in a house of the user. Camera devices 18 of the computer device 10, which takes the form of the HMD device 24 in this example, are configured to capture RBG data and depth data of the physical environment 28. The illustrated example of the physical environment 28 includes a plurality of different physical objects 30, such as, for example, a first wall 30A, a second wall 30B, a third wall 30C, a ceiling 30D, a first table 30E, a second table 30F, a physical space of the room itself, a floor 30G, a room furnishing such as a couch 30H, a fireplace 30I, etc. These physical objects 30 are imaged along with the physical environment 28 by the camera devices 18, and sent to the processor 12 of the HMD device 24 for surface reconstruction and scene decomposition, as described in more detail below.

Turning back to FIG. 1, RBG data 32 and depth data 34 captured by the camera device 18 are sent to the processor 12 as scene data 36. In one example, the computer device 10 further includes a deep neural network processor 38 or chipset that is configured to process the scene data 36 using a trained artificial intelligence machine learning model 40. The deep neural network processor 38 may be further configured to execute a natural language processing module 42 configured to process natural language input received from a user of the computer device 10, as will be described in more detail below. The deep neural network processor 38 may include processing hardware that is designed to more efficiently perform neural network and machine learning tasks and processes than a general-purpose processor. In another example, the computer device 10 may not include the deep neural network processor 38, and the processor 12 may instead be configured to perform the functions and processes of the deep neural network processor 38 described herein.

The deep neural network processor 38 may be implemented using any combination of state-of-the-art and/or future machine learning (ML), artificial intelligence (AI), and/or natural language processing (NLP) techniques. Non-limiting examples of techniques that may be incorporated in an implementation of the deep neural network processor 38 include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes of the deep neural network processor 38 described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The natural language processing module 42 may utilize vocabulary features to guide sampling/searching for words for recognition of speech, such as, for example, semantic tags that will be described in more detail below. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word, such as a particular semantic tag, is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

Figure 4:
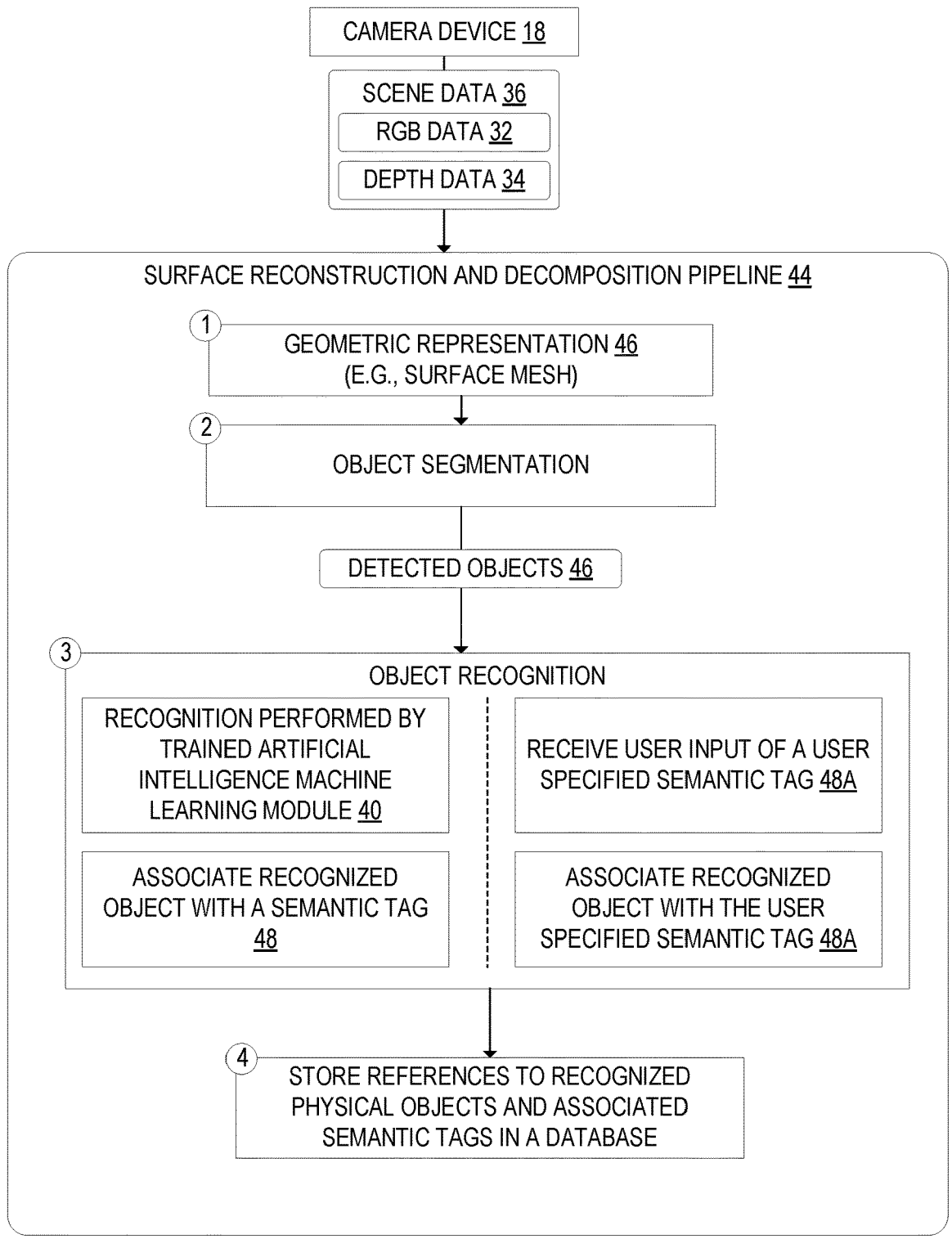
FIG. 4 shows an example surface reconstruction and decomposition pipeline executed by the computer device of FIG. 1.

The deep neural network processor 38 and/or the processor 12 may be configured to receive scene data 36 of the physical environment 38 captured by the camera device 18. The deep neural network processor 38 may be configured to process the scene data 36 using a surface reconstruction and decomposition pipeline 44 to detect one or more physical objects 30 in the physical environment 28, and recognize the one or more physical objects 30 based on the trained artificial intelligence machine learning model 40. FIG. 4 illustrates an example surface reconstruction and decomposition pipeline 44. At step (1) of the pipeline, a geometric representation 46 is generated for the scene data 36 received from the camera device 18, such as, for example, a mesh having vertices and indices that represents the physical environment 28. The geometric representation 46 of the scene data 36 may be generated via any suitable surface reconstruction method.

At step (2), the surface reconstruction and decomposition pipeline 42 is further configured to process the scene data 36 using the trained artificial intelligence machine learning module 40, such as, for example, a Deep Neural Network (DNN) to identify object boundaries within the scene data. After identifying object boundaries, the surface reconstruction and decomposition pipeline 44 may include object segmentation to detect one or more objects in the scene. As a specific example, the DNN may be a Fully Convolutional Network (FCN), which is a Convolutional Neural Network where the last fully connected layer is substituted by another convolutional layer with a large receptive field.

At step (3), the surface reconstruction and decomposition pipeline 44 may be configured to recognize one or more of the detected objects 46 in the scene data 36. In one example, the artificial intelligence machine learning module 40 may be configured to process the detected object 46 and perform object recognition based on different characteristics of the detected object 46, such as, for example, surface geometry, color, size, relation to other objects in the physical environment, texture, etc. For example, the FCN may be trained to identify objects including, but limited to, an unrecognized object, a room, a wall, a room furnishing, a table, a chair, a surface, physical location, and a person. However, it should be appreciated that the artificial intelligence machine learning module 40 may be configured to recognize any other suitable type of physical object, such as, for example, a floor, a ceiling, a window, a door, a monitor, a stair, a natural environment, etc.

Based on the recognized object, the trained artificial intelligence machine learning module 40 may be configured to select one or more semantic tags 48 to associated with the recognized object, such as, for example, "couch", "kitchen", "stove", "table", "living room", "office", etc. The processor 12 and/or deep neural network processor 38 may be configured to select a semantic tag 48 to be associated with the recognized physical object. The semantic tag 48 may be selected from a list of semantic tags which, for example, may include a plurality of predetermined semantic tags 48. The list of semantic tags may be extensible. For example, the trained artificial intelligence machine learning model 40 may be configured to detect frequently used terms that have been used to reference objects, and add those frequently used terms to the list of semantic tags.

In another example, semantic tags 48 may be received from a user and associated with a particular physical object 30 detected and known to the computer device 10. For example, the processor 12 may be configured to receive a user input directed to the detected physical object 46 in the physical environment 28, the user input including a user specified semantic tag 48A. The computer device 10 may detect that the user input is directed to a particular detected physical object 46 based on, for example, a detected gaze direction of the user, a hand gesture of the user, or another type of user selection of a particular physical object. The processor 12 may be configured to associate the detected physical object 46 with the user specified semantic tag 48A in the database. The user specified semantic tag 48A may be associated with the physical object alternatively or in addition to the semantic tag 48 selected by the trained artificial intelligence machine learning model 40. Additionally, if the user specified semantic tag 48A is not included in the extensible list of semantic tags, the processor 12 may be configured to add the user specified semantic tag 48A to the extensible list, and the artificial intelligence machine learning model 40 may be further configured to learn new user specified semantic tags 48A over time.

At step (4), the processor 12 and/or deep neural network processor 38 may be configured to store a reference to the recognized physical object 30 in a database with an associated semantic tag 48. The database may, for example, be stored in the non-volatile memory 44 of the computer device 10 that is accessible by the processor 12 and the deep neural network processor 38. The recognized physical objects stored in the database may be re-found in updated scene data 36 and tracked across successive updates to the scene data 36, such as, for example, in real-time as the user moves around the physical environment 28. Additionally, specific object class-based heuristics may be applied to improve robustness of this association. For example, structural objects such as, for example, walls, floors, ceilings, etc., may be assumed to be static and will have tighter tolerances for motion than objects of other classes such as chairs, people, and other types of objects that are likely to move. Known relationships between detectable surfaces of objects may also be used for tracking and association between successive updates. For example, a chair object has a known association between a back plane and a seat of the chair (e.g. connected vertical and horizontal planes), which may be used to predict how a rotation or changing orientation of the chair physical object will affect the relative positions of the surfaces of the chair in the scene data 36. Thus, if a chair physical object is rotated between successive updates thus changing the geometric representation of that chair, the same chair object may nonetheless be tracked and associated with the corresponding reference in the database.

The surface reconstruction and decomposition pipeline 44 discussed above may be performed in real-time by the deep neural network processor 38, and the database may be continuously updated with recognized physical objects and associated semantic tags as updated scene data 36 is captured by the camera device 18 of the computer device 10.

Figure 5:
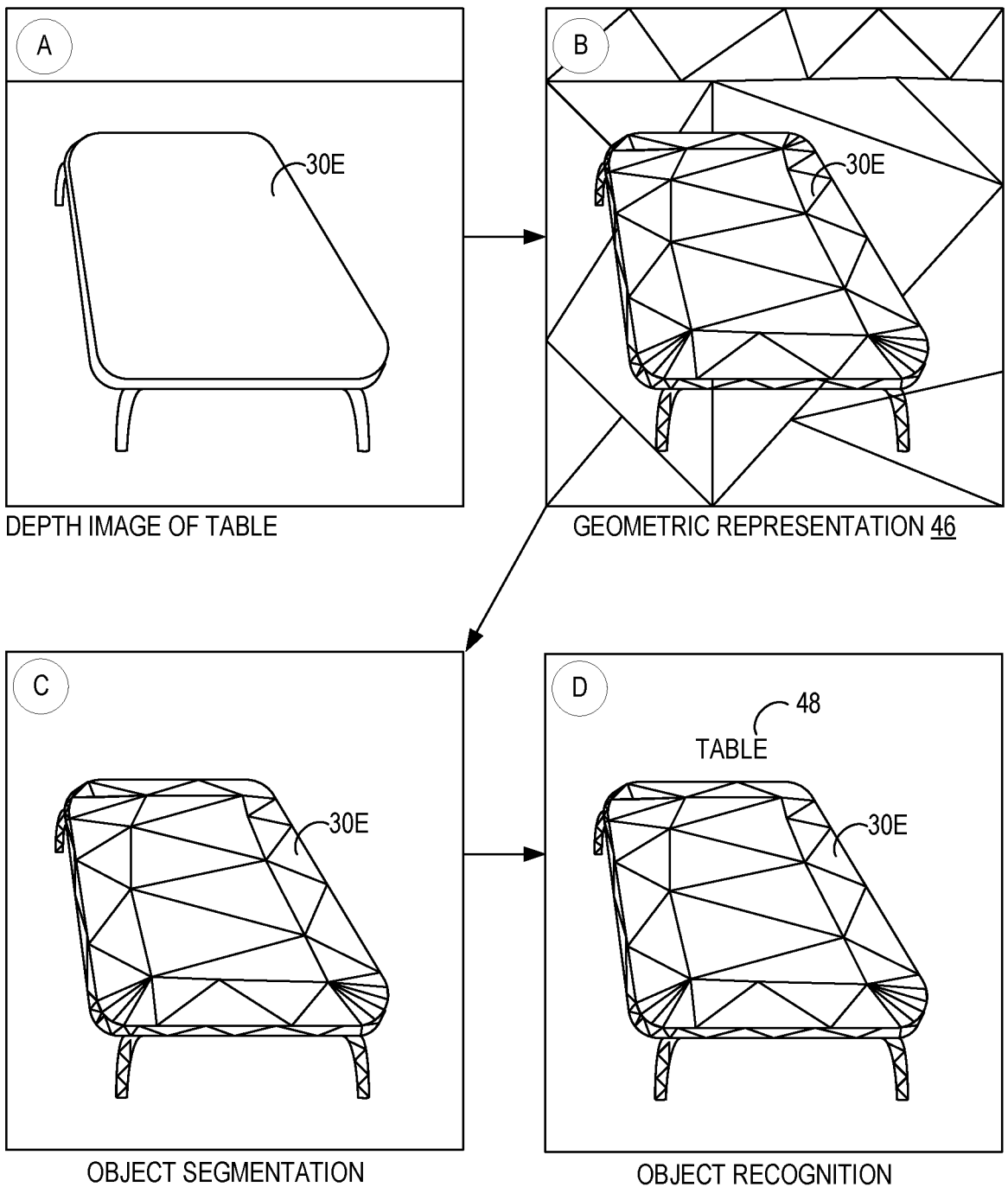
FIG. 5 at (A) shows an example depth image of a table physical object from the physical environment captured by the computer device of FIG. 1.

FIG. 5 illustrates an example of scene data being processed by the surface reconstruction and decomposition pipeline 44 described above. FIG. 5 at (A) shows a portion of an example depth image centered at the physical table object 30E of the physical environment 28 of FIG. 3. The depth image is processed by surface reconstruction techniques at step (1) of the surface reconstruction and decomposition pipeline 44 to generate a geometric representation 46 of the physical environment 28. FIG. 5 at (B) shows an example geometric representation 46 in the form of a surface mesh.

At step (2) of the surface reconstruction and decomposition pipeline 42, the scene data including the depth image is processed by an artificial intelligence machine learning model 40 such as an FCN to identify object boundaries and segment the geometric representation 46 of the physical environment 28 into detected physical objects. In the example illustrated in FIG. 5 at (C), object boundaries of the geometric representation 46 of the table object have been identified, and a geometric representation of the table object 30E has been segmented into a detected object.

At FIG. 5 at (D), the detected object may be processed by the trained artificial intelligence learning model 40 to recognize the detected object based on different factors or characteristics of the object, such as, for example, geometric shape, size, color, surface texture, etc. In the illustrated example, the detected object has been recognized as a table, and a corresponding "table" semantic tag 48 may be associated with the recognized physical object. It should be appreciated that other semantic tags may be selected and associated with the recognized object based on other factors. For example, if the recognized object is located in a room that has already been semantically tagged as a "living room", then the recognized table object located in that room may also inherit the "living room" semantic tag. In this manner, each of the detected physical objects may be associated with one or more semantic tags 48, and references to those detected physical objects may be stored with the one or more semantic tags 48 in the database.

Figure 6:
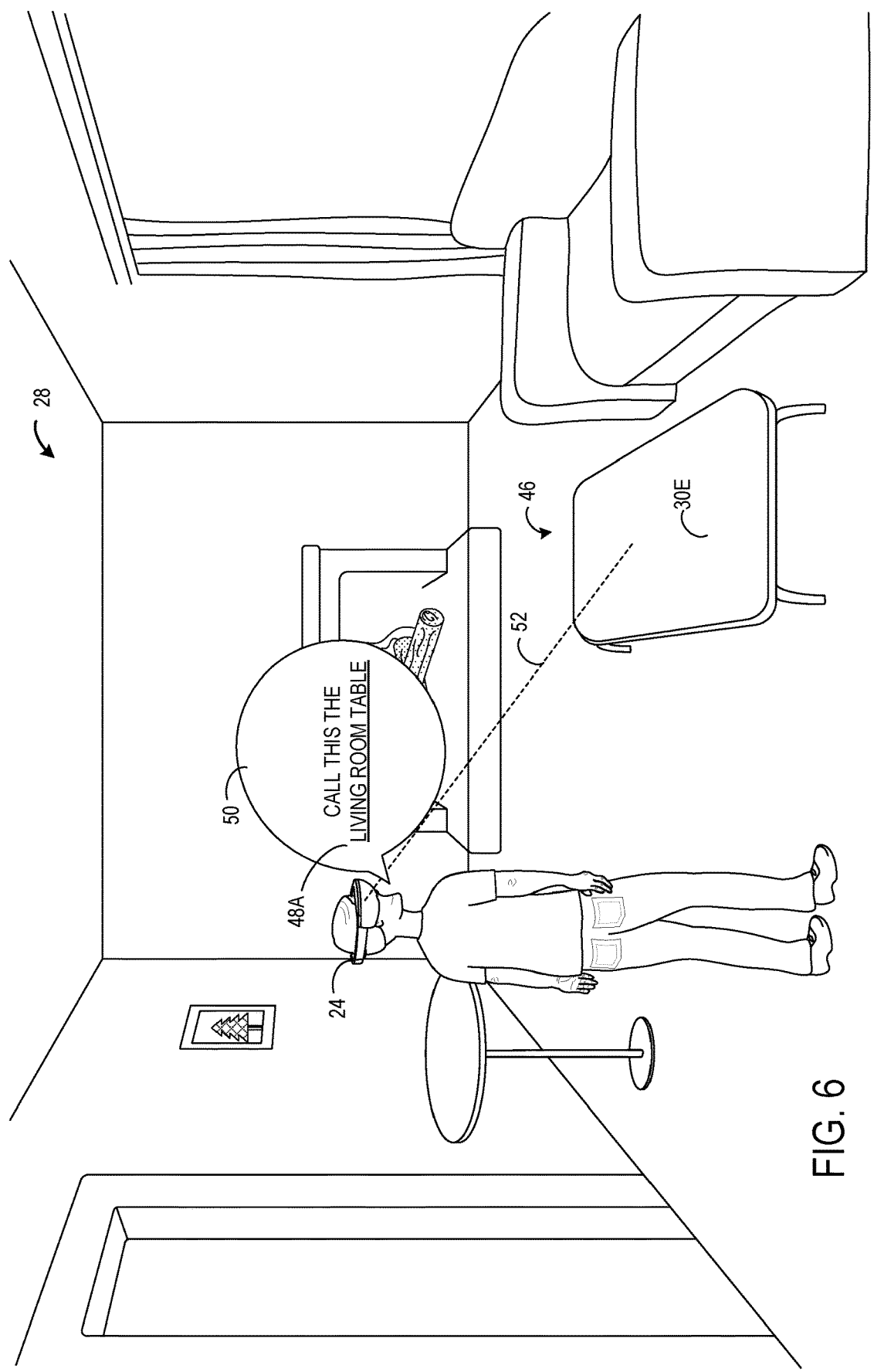
FIG. 6 shows an example natural language input for associated a semantic tag with a detected physical object for the computer device of FIG. 1.

FIG. 6 illustrates an example of semantically tagging a detected object based on a user input. As shown, the computer device 10 in the form of an HMD device 24 may be configured to receive a user input 50 directed to a detected physical object 46 in the physical environment 28. The HMD device 24 may receive the user input 50 that is a voice input via a microphone input device. The process for semantically tagging the detected physical object 46 may be initiated based on the user input 50. For example, after processing by the natural language processing module 42, the HMD device 24 may detect that the user is attempting to name an object based on the terms "call this". The natural language processing module 42 may be trained to initiate this process based on other terms, such as, for example, "name this", "refer to this as", etc. However, as the term "this" does not itself indicate a specific object, the HMD device 24 may be further configured to attempt to resolve the identify of the object referred to by the term "this". In the illustrated example, the HMD device 24 has detected the table object 30E, and has also detected a current user gaze direction 52 that is directed toward the detected physical object 46. Thus, the HMD device 24 may resolve the term "this" as being directed to the detected physical object 46 that intersects with the current user gaze direction 52. As another example, the HMD device 24 may resolve the term "this" as being directed to the detected physical object 46 based on a detected hand gesture of the user, such as, for example, a pointing gesture, a tapping gesture, etc. As another example, the HMD device 24 may be configured to prompt the user to enter a disambiguation input to select a specific object. It should be appreciated that the example disambiguation techniques discussed above are merely exemplary, and that the HMD device 24 may use other techniques.

The user input 50 is processed by the natural language processing module 42 executed by the deep neural network processor 38 and/or processor 12 to identify a user specified semantic tag 48A of "living room table". The processor 12 may then be configured to associate the detected physical object 46 with the user specified semantic tag 48A in the database. In the manner described above, semantic tags 48 may be associated with physical objects 30 in the physical environment 28 based on user input 50 and/or programmatically by the trained artificial intelligence machine learning model 40.

Turning back to FIG. 1, the computer device 10 may be configured to store a database 54 of physical objects 46 and virtual objects 56 that have been associated with one or more semantic tags 48. The semantic tags 48 may be associated with each physical object 46 detected by the computer device 10 according to the techniques and processes discussed above. The virtual objects 56 may be associated with predetermined semantic tags as well as user specified semantic tags 48A. For example, a virtual object 56 that is associated with a particular application program may be associated with a semantic tag 48 related to that application program. As a specific example, a virtual object that presents a graphical user interface (GUI) of an Internet browsing application program may be associated with the semantic tags "internet browser", "utility application", "web browser", etc. Virtual objects 56 that take a particular form, such as, for example, a virtual cactus object may be associated with the semantic tags "plant", "cactus", "virtual furnishings", etc. Virtual objects 56 may also be associated with user specified semantic tags 48A according to the same process discussed above with physical objects. For example, the HMD device 24 may determine that a user's gaze direction intersects with a pet dog virtual object, and receive a user input of "Name him Spot". Thus, the HMD device 24 may associated the user specified semantic tag of "Spot" with the pet dog virtual object alongside other predetermined semantic tags such as "dog", "virtual pet", etc. It should be appreciated that the example physical objects, virtual objects, and their associated semantic tags 48 discussed above are merely exemplary, and that references for other types of physical objects, virtual objects, and associated semantic tags may be stored in the database 54.

The database 54 may also store detected physical locations 58 for the detected physical objects 46. The detected physical locations 58 may be updated in real-time based on scene data 36 captured by the camera device 18. Virtual objects 56 that have been instantiated may also have virtual locations 60 in the physical environment 28 where the virtual object 56 may be displayed via the display device 22 in an augment reality configuration.

As illustrated in FIG. 1, the computer device 10 may further be configured to receive a natural language input 62 from a user via the input device 20. In one example, the natural language input 62 is a voice input received via the input device 20, which, for example, may take the form of a microphone device. However, in scenarios where voice input is not useable (e.g. noisy environment, broken microphone, etc.) or to provide affordance for users that are unable to effectively use voice commands such as users with a voice disability, the computer device 10 may be configured to receive the natural language input 62 via alternative input modalities. For example, the natural language input 62 may take the form of a text input that is received via a physical keyboard or controller input device. As another example, the natural language input 62 may be a text input received via a virtual keyboard or another type of GUI element that the user may interact with via gestures detected by the camera device 18. In these scenarios, the natural language input 62 may be processed using the natural language processing module 42 executed by the deep neural network processor 38 and/or the processor 12.

The natural language processing module 42 may be configured to perform semantic processing on the natural language input 62 to determine a user specified operation 64 and identify one or more semantic tags 66 indicated by the natural language input 62. The user specified operation 64 may be identified from a list of operations for virtual objects 68 that a virtual object handling module 70 is configured to perform. For example, the operations 68 may include a move operation, an application start operation, and other types of operations that may be performed on virtual objects 56. It should be appreciated that these operations are merely exemplary, and that other types of operations may be performed by the virtual object handling module 70 executed by the processor 12 of the computer device 10.

In one example, to identify the user specified operation 64, the natural language processing module 42 may be configured to identify a verb in the natural language input 62, and compare the identified verb to the list of operations for virtual object 68. For example, the verbs "move", "transfer", "put", etc., may each be associated with a move operation. As another example, the verbs "open", "show", "start", etc., may each be associated with the application start operation. As yet another example, the verbs "modify", "resize", "change", etc., may each be associated with the modification operation. It should be appreciated that the specific operations and associated verbs/terms discussed above are merely exemplary, and that other types of operations may be performed by the virtual object handling module 70, and each operation may be associated with other verbs/terms identified by the natural language processing module 42. As a few other non-limiting examples, the operations 68 may further include a copy operation, a deletion operation, a resizing operation, a fitting operation, etc.

The processor 12 may be further configured to compare the identified semantic tags 66 indicated in the natural language input 62 to the semantic tags 48 associated with the detected physical objects 46 and virtual objects 56 stored in the database 54. The processor 12 may select a target virtual object 72 and a target physical object 74 from the plurality of physical objects and virtual objects in the database 54 based on the identified one or more semantic tags 66 indicated in the natural language input 62. For example, the processor 12 may be configured to select the target virtual object 72 and the target physical object 74 based on matches between the associated semantic tags 48 for the target virtual object and target physical object 74 and the identified semantic tags 66 in the natural language input 42.

As a specific example, if the natural language input 62 is "Move the virtual plant to the living room table", the natural language processing module 42 may be configured to identify the verb "move", and select the move operation as the user specified operation 64. The natural language processing module 42 may further identify the nouns "virtual plant" and "living room table" as identified semantic tags 66. By comparing the identified semantic tags 66 to the database 54, the processor 12 may determine that the tag "virtual plant" is referring to a plant virtual object, and the tag "living room table" is referring to the table in the living room that was detected and associated with that semantic tag in the example illustrated in FIGS. 3-6. Thus, the processor 12 may selected the plant virtual object as the target virtual object 72 and the living room table physical object as the target physical object 74.

In some examples, the identified semantic tag 66 may not completely match the associated semantic tags 48 of the virtual objects 56 and detected physical objects 46 stored in the database 54, or may match multiple different objects. As a specific example, if the natural language input 62 is "Move the virtual plant to the table", the processor 12 may be unable to resolve which table object the identified semantic tag "table" is referring to if multiple table objects have been detected in the physical environment. The processor 12 may be further configured to determine a confidence value for the selection of the target virtual object 72 or the target physical object 74. The confidence value may be calculated based on a degree of matching between the identified semantic tags 66 and the associated semantic tags 48 of the virtual and physical objects, as well as other weighting factors.

Figure 7:
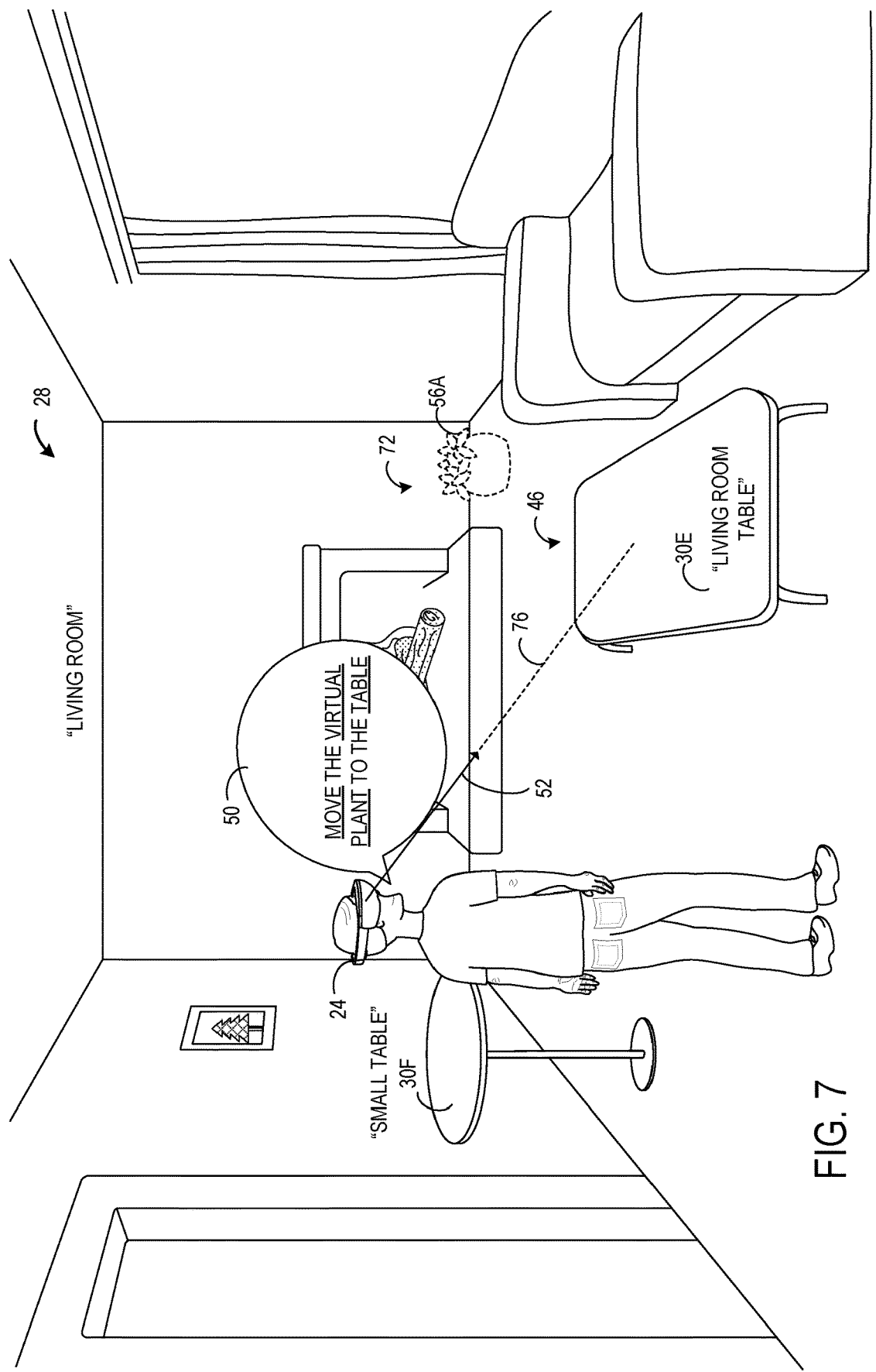
FIG. 7 shows an example natural language input for performing a specified user operation on a target virtual object for the computer device of FIG. 1.

The processor 12 may be further configured to determine whether the confidence value for a particular selection is below a threshold value. Based on determining that the confidence value is below a threshold value, the processor 12 may be further configured to perform a disambiguation process. FIG. 7 shows an example disambiguation process. As shown, the HMD device 24 has received a natural language input 42 via a voice input of "Move the virtual plant to the table". The semantic tag "move" is used to identify the user specified operation 64 as the move operation and the semantic tag "virtual plant" has been used to select the plant virtual object 56A as the target virtual object 72 with a high degree of confidence. However, the semantic tag "table" may match to both the first table physical object 30E associated with the semantic tag "living room table" and the second table physical object 30F associated with the semantic tag "small table". Due to multiple matches, the HMD device 24 may determine that the selection of the target physical object 74 has a confidence value below a threshold value, and thus enter a disambiguation mode. It should be appreciated that the threshold value may be set to any suitable value.

In one example, to disambiguate the selection of the target physical object 74, the HMD device 24 may be configured to determine a user indicated direction 76 for a user of the head mounted display device 24. In the example illustrated in FIG. 7, the user indicated direction 76 is determined based on a detected gaze direction 52 of the user of the HMD device 24. The gaze direction 52 of the user may be detected via the inward facing camera devices 18B of the HMD device 24, or via another suitable technique. However, it should be appreciated that the user indicated direction 76 may be determined via other methods. For example, the user indicated direction 76 may be determined based on a detected hand gesture of the user, such as, for example, a pointing hand gesture detected via images captured by the camera device 18 of the HMD device 24. In this example, the HMD device 24 may be configured to disambiguate the selected of the target virtual object 72 or target physical object 74 further based on the determined user indicated direction 76. In the example illustrated in FIG. 7, the HMD device 24 may determine that the user indicated direction 76 is directed toward the first table physical object 30E, and may thus select the first table physical object 30E as the target physical object 74. This process may also be performed to select the target virtual object 72 in a similar manner.

Figure 8:
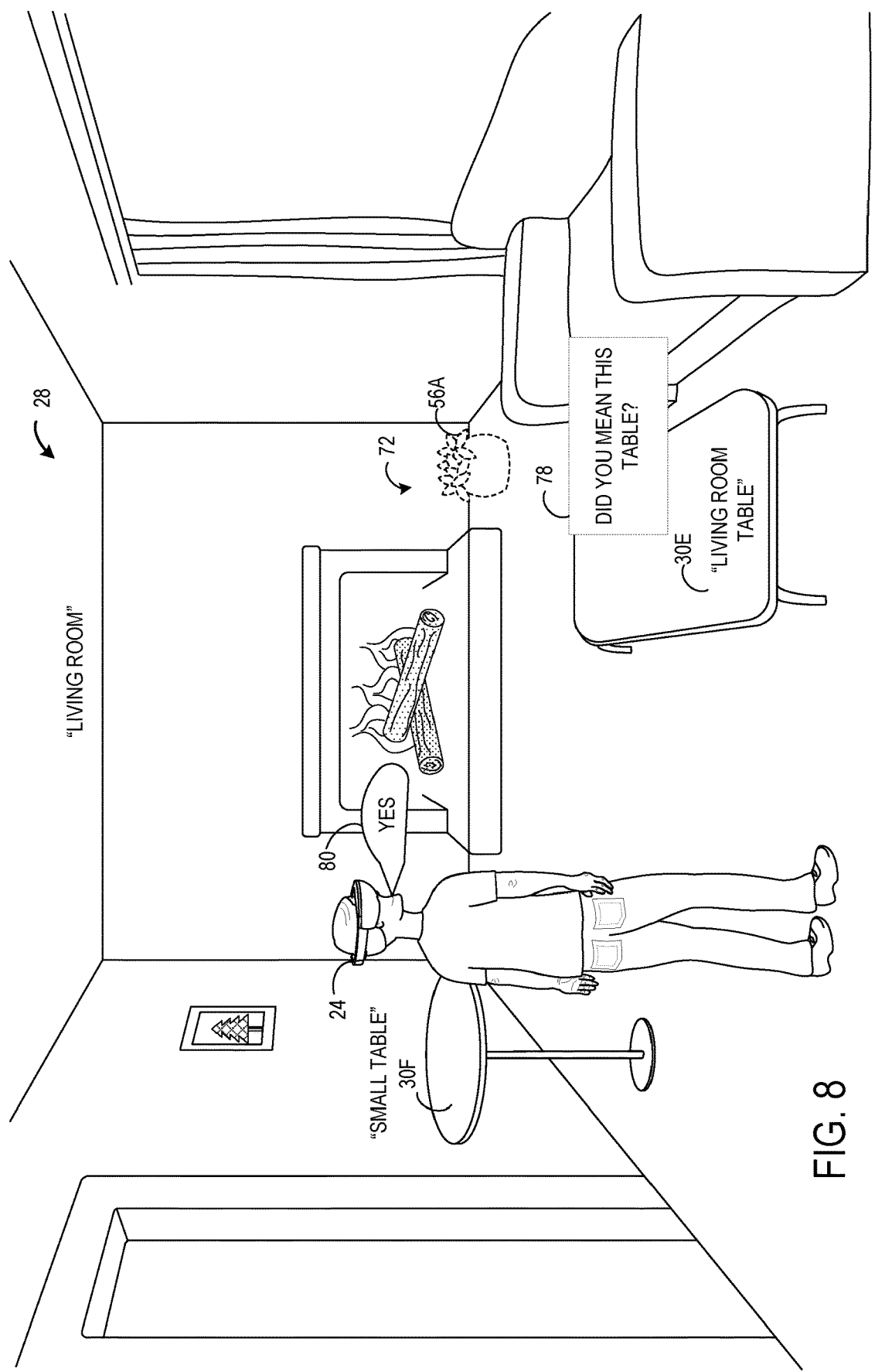
FIG. 8 shows an example disambiguation query for the computer device of FIG. 1.

FIG. 8 illustrates another example disambiguation technique. Based on determining that the confidence value for the selection of the target virtual object 72 or target physical object 74 is lower than the threshold value, the HMD device 24 may be configured to present a query 78 to the user for a user confirmation 80 of the selection of the target virtual object 72 or the target physical object 74. In the illustrated example, the query 78 is presented as the text "Did you mean this table 17" in a virtual text box located near the selected target physical object 74 of the first table physical object 30E. After presentation of the query 78 to the user, the HMD device 24 may receive a user input of a user confirmation 80, which, in the illustrated example, is a voice input of "Yes". In another example, the query 78 may take other forms, such as, for example, audio that is output from a speaker or headphone device of the HMD device 24. As yet another example, the query 78 may take the form of a highlight or other visual indicator of the selected object. The user confirmation 80 may also take other suitable forms, such as, for example, a gesture input, a text input, a button input, etc. These disambiguation techniques may be used during the selection of both the target virtual object 72 and the target physical object 74. Additionally, it should be appreciated that other disambiguation techniques may be implemented by the processor 12 during selection of the target virtual object 72 and the target physical object 74.

After determining the user specified operation 64, the target virtual object 72, and the target physical object 74, the virtual object handling module 70 may be configured to perform the determined user specified operation 64 on the target virtual object 72 based on the target physical object 74. In the example illustrated in FIG. 9, the user specified operation 64 indicated in the natural language input 62 is a move operation. To perform the move operation, the virtual object handling module 70 may be configured to update a virtual location 60 of the target virtual object 72 in the physical environment 28 based on the physical location 58 associated with the target physical object 74. In the illustrated example, the target virtual object 72 is the virtual plant object 56A, and the target physical object 74 is the first table physical object 30E. To perform the move operation, the HMD device 24 may be configured to update a virtual location 60 of the virtual plant object 56A from the previous location in the corner of the room to a new location based on the physical location 58 associated with the first table physical object 30E, such as, for example, on top of the table. After performing the move operation, the HMD device 24 may be configured to display the target virtual object 72 at the updated location 60 via the display device 22.

Figure 9:
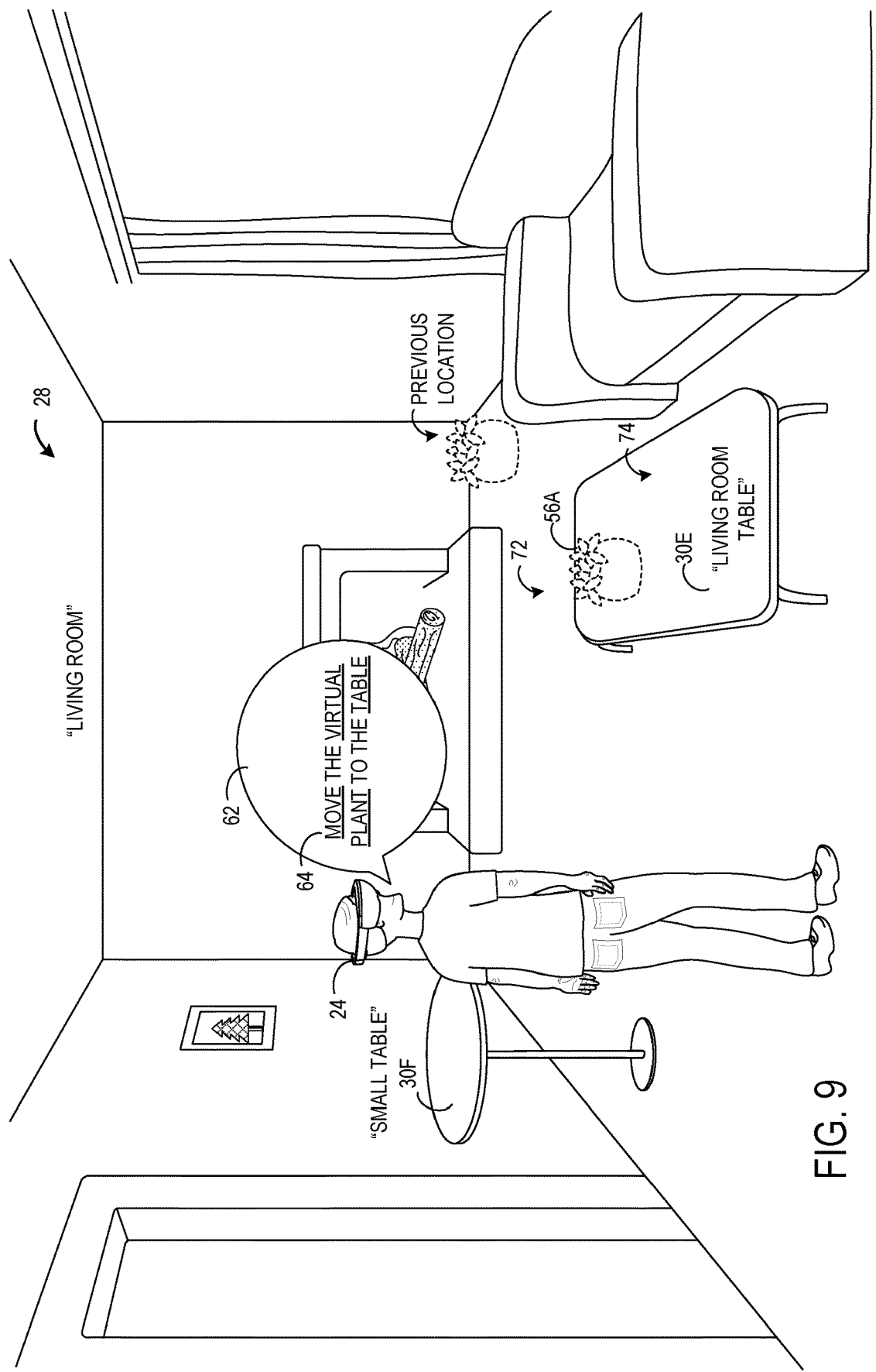
FIG. 9 shows an example natural language input for performing a user specified operation of a target virtual object for the computer device of FIG. 1.

In the example illustrated in FIG. 9, both the target virtual object 72 and the target physical object 74 are located within a field of view of the camera device 22 of the HMD device 24. However, it should be appreciated that the techniques described herein do not require the target virtual object 72 and the target physical object 74 to be within a field of view of the HMD device 24. Rather, as the objects are referenced via semantic tags indicated in a natural language input, virtual object outside of a field of view of the camera 18 of the HMD device 24 may be moved to locations of physical objects that are also outside of the field of view of the HMD device 24. That is, the user specified operation 64 may be performed on the target virtual object 72 based on the target physical object 74 when one or more of those objects are outside a field of view of the HMD device 24.

Figure 10:
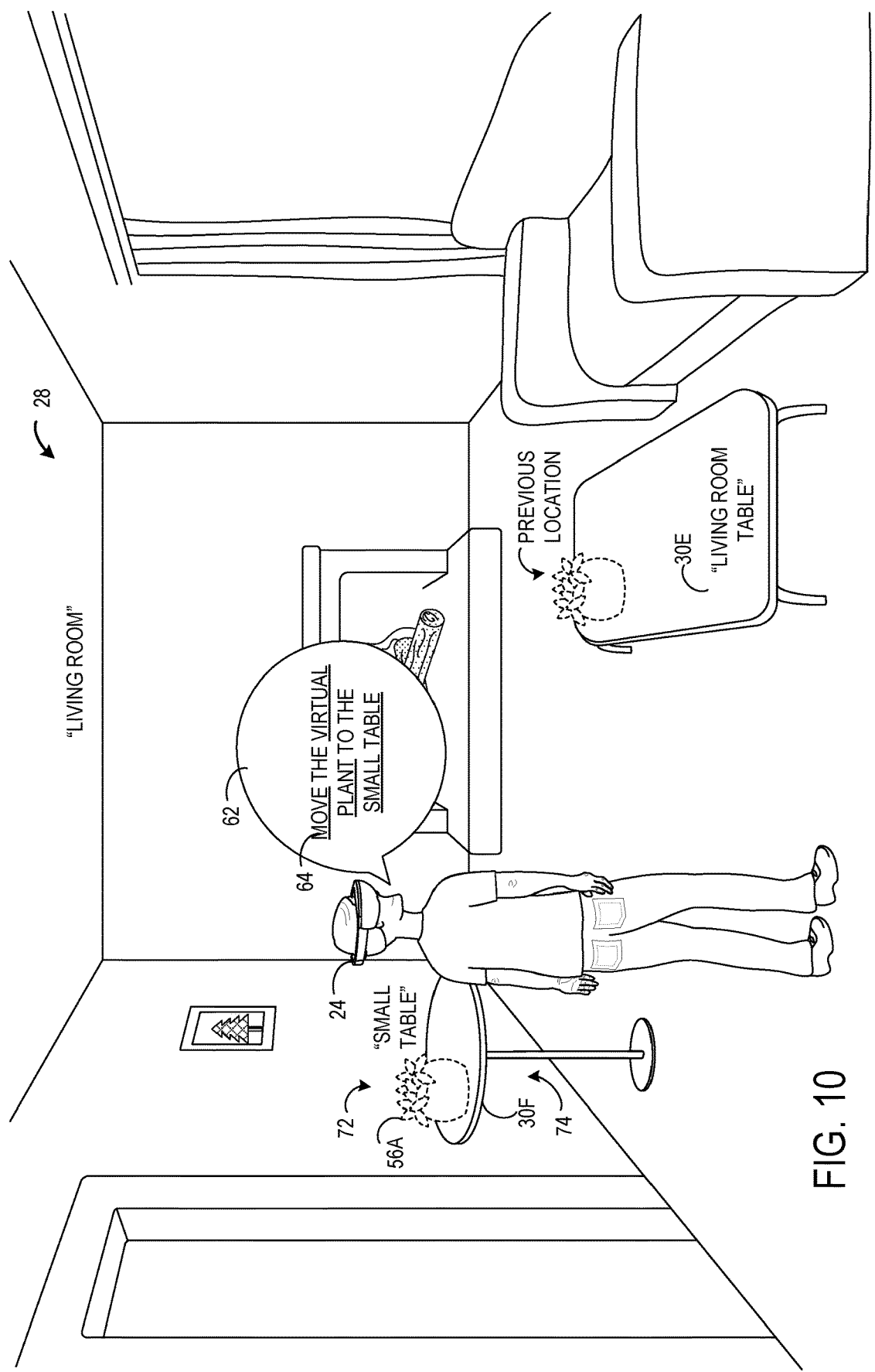
FIG. 10 shows an example move operation that has been performed on a target virtual object for the computer device of FIG. 1.

In FIG. 10, the target physical object 74 associated with the semantic tag "small table" indicated in the natural user input 62 received from the user has a physical location that is outside of a field of view of the camera device 18 of the head mounted display device 24. Nonetheless, the HMD device 24 may perform the move operation and update a location of the target virtual object 72, the plant virtual object in this example, to a physical location of the target physical object 74. In this example, the target virtual object 72 will not be displayed on the display 22 of the HMD device 24 until the user changes their viewpoint and the updated location of the target virtual object 72 enters the field of view of the camera device 18 of the HMD device 24. Similarly, target virtual objects that are currently located outside of the field of view of the HMD device 22 may be moved to a location of a target physical object that is within field of view of the HMD device 22. Additionally, it should be appreciated that while the target virtual object 72 is being moved within the same room in these examples described above, the target virtual object 72 may be moved to any physical object in the database 54, which may include other rooms and objects located in other rooms.

Figure 11:
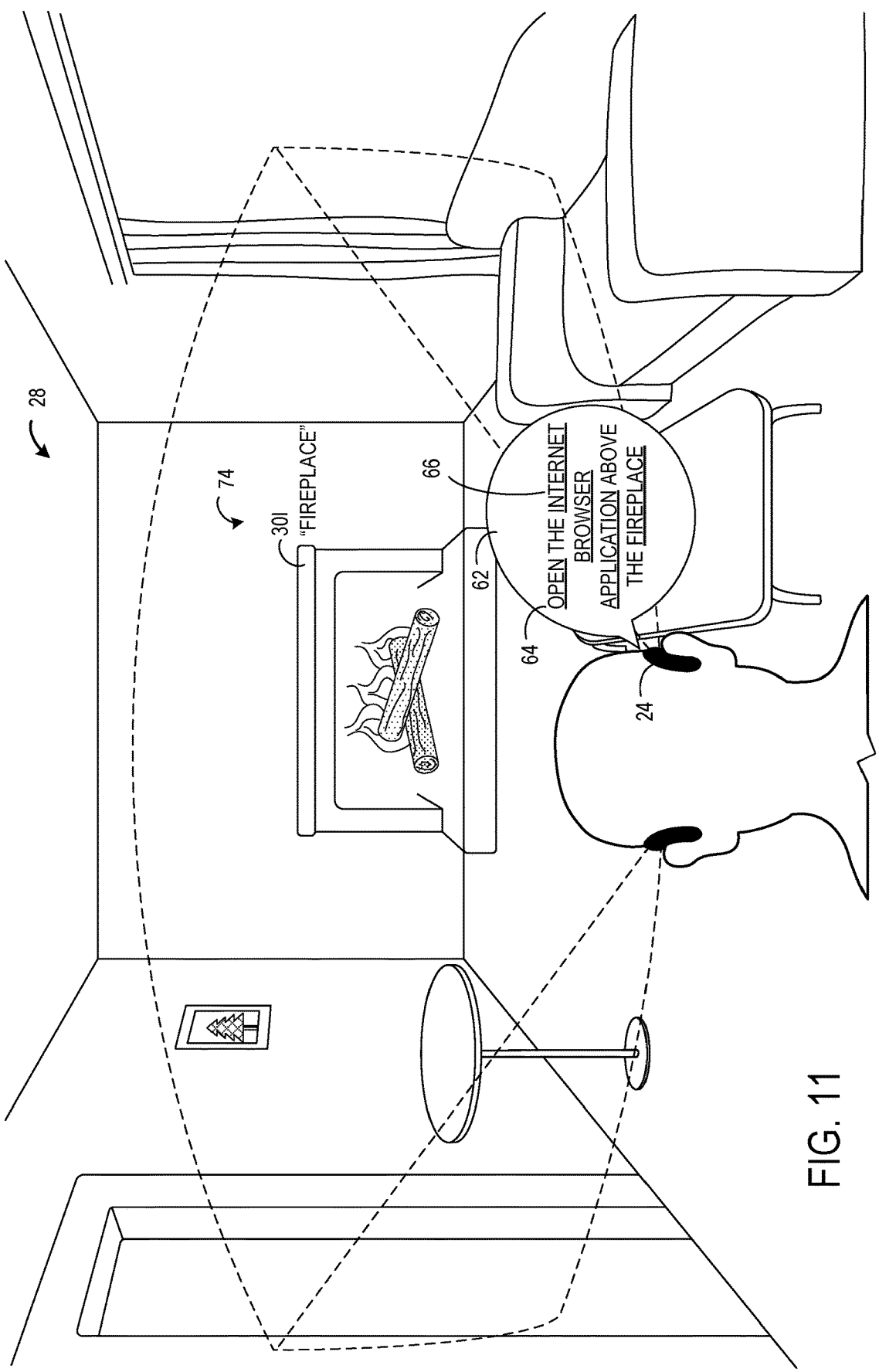
FIG. 11 shows another example natural language input for performing another example user specified operation on a target virtual object for the computer device of FIG. 1.

FIG. 11 shows another example user specified operation 64. The HMD device 24 may identify the user specified operation 64 as an application start operation based on the natural language input 62 received from the user. In this example, the verb "open" is associated with the application start operation. However, it should be appreciated that other verbs and semantic tags may also be associated with the application start operation. The HMD device 24 may further identify semantic tags 66 of "Internet Browser" and "Fireplace". The HMD device 24 may select a target application program from a plurality of application programs 84 executable by the processor 12 based on the identified one or more semantic tags 66. Similarly to the selection of the virtual and physical objects, the processor 12 may select the target application program based on a match between the identified semantic tags 66 and the semantic tags 48 associated with the plurality of application programs 60. In one example, references to the plurality of application programs 60 and the associated semantic tags 48 may also be stored in the database 54.

In the example illustrated in FIG. 11, based on the semantic tag "Internet Browser", the HMD device 24 may determine that the application start operation should be performed on a virtual object associated with an Internet browser application program executed on the HMD device 24. For example, the virtual object may be a virtual window that content of the application program may be displayed within. Additionally, based on the semantic tag "Fireplace", the HMD device 24 may select the fireplace physical object 30I that was previously detected and recognized as the target physical object 74. Before entering the natural language input 62 shown in FIG. 11, a virtual object for the Internet browser application program has not be instantiated. Thus, in this example, the application start operation is not moving an already existing virtual object to a new location, but is generating the virtual object.

Figure 12:
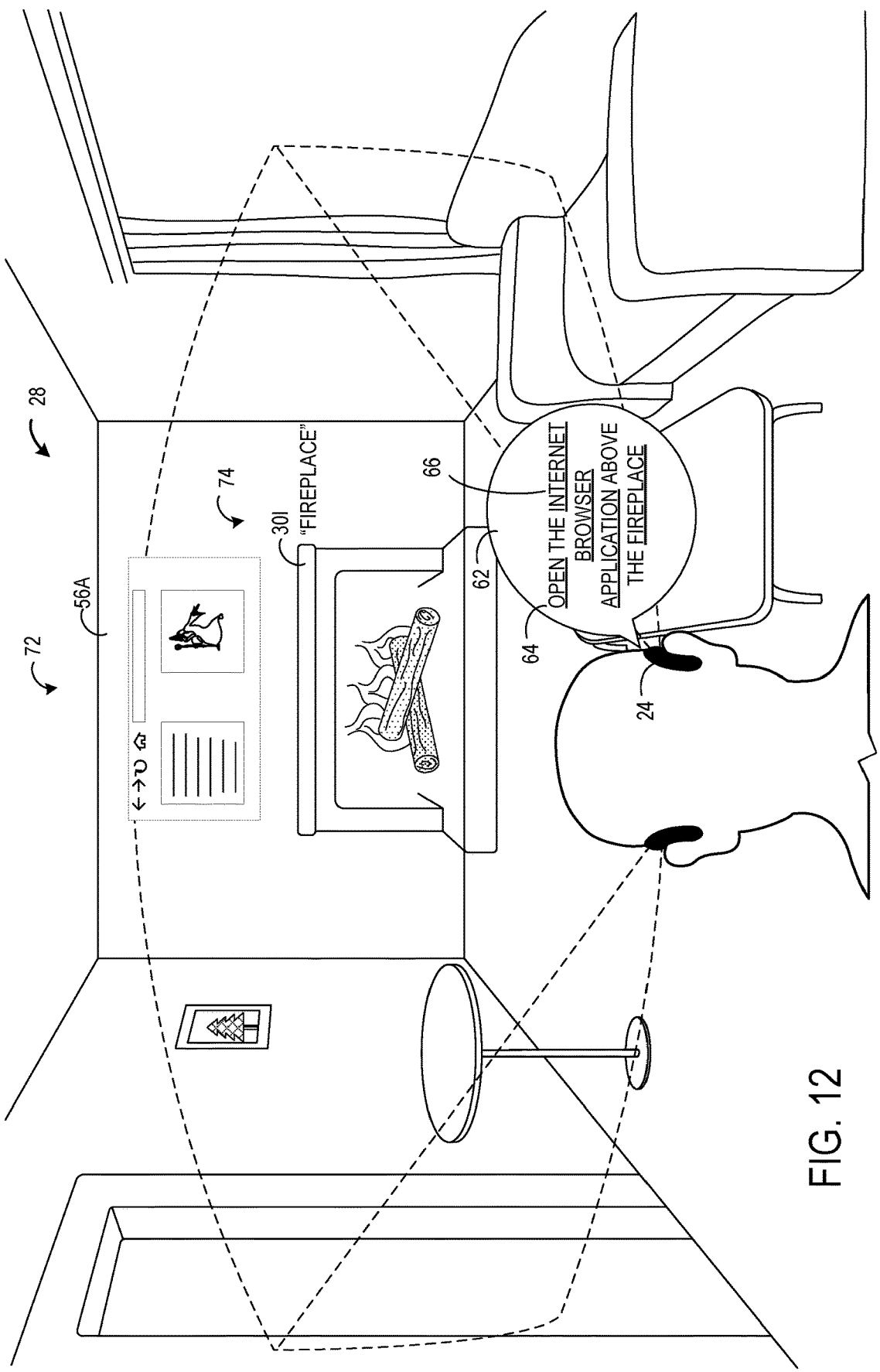
FIG. 12 shows an example application start operation that has been performed on a target virtual object for the computer device of FIG. 1.

FIG. 12 continues the example of FIG. 11. As shown, to perform the application start operation for the user specified operation 64, the HMD device 24 may be configured to generate a target virtual object 72 associated with the target application program selected from the plurality of application programs 60 based on the identified semantic tags 66. In this example, the target virtual object 72 is a display window virtual object that contains content for the target application program, which is an internet browser in this specific example. Additionally, the HMD device 24 may set a virtual location 60 for the target virtual object 72 based on a physical location 58 of the target physical object 74, which is the fireplace in the illustrated example. The HMD device 24 may further be configured to display the generated target virtual object 72 at the virtual location 60 based on the physical location 58 associated with the target physical object 72, which, in the example illustrated in FIG. 12, is "above" the "fireplace".

Figure 13:
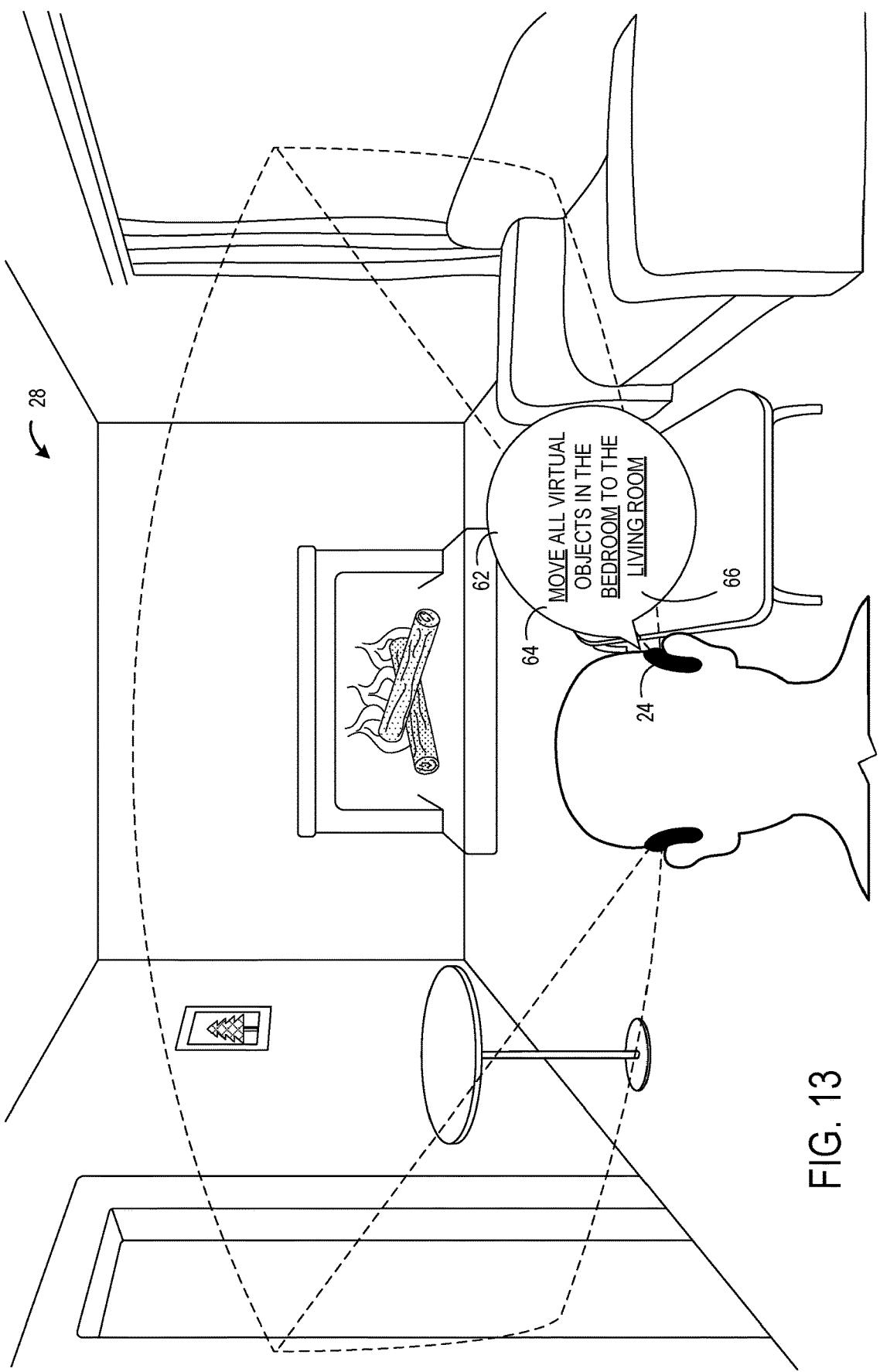
FIG. 13 shows another example natural language input for performing a user specified operation on a plurality of target virtual objects for the computer device of FIG. 1.

In the examples discussed above, the user specified operation 64 was performed on one target virtual object 72. However, it should be appreciated that more than one target virtual object 72 may be specified by the natural language input 62, and the user specified operation 64 may be performed on each of the more than one target virtual object 72. FIG. 13 illustrates an example where the user has entered the natural language input 62 of "move all virtual object in the bedroom to the living room".

Figure 14:
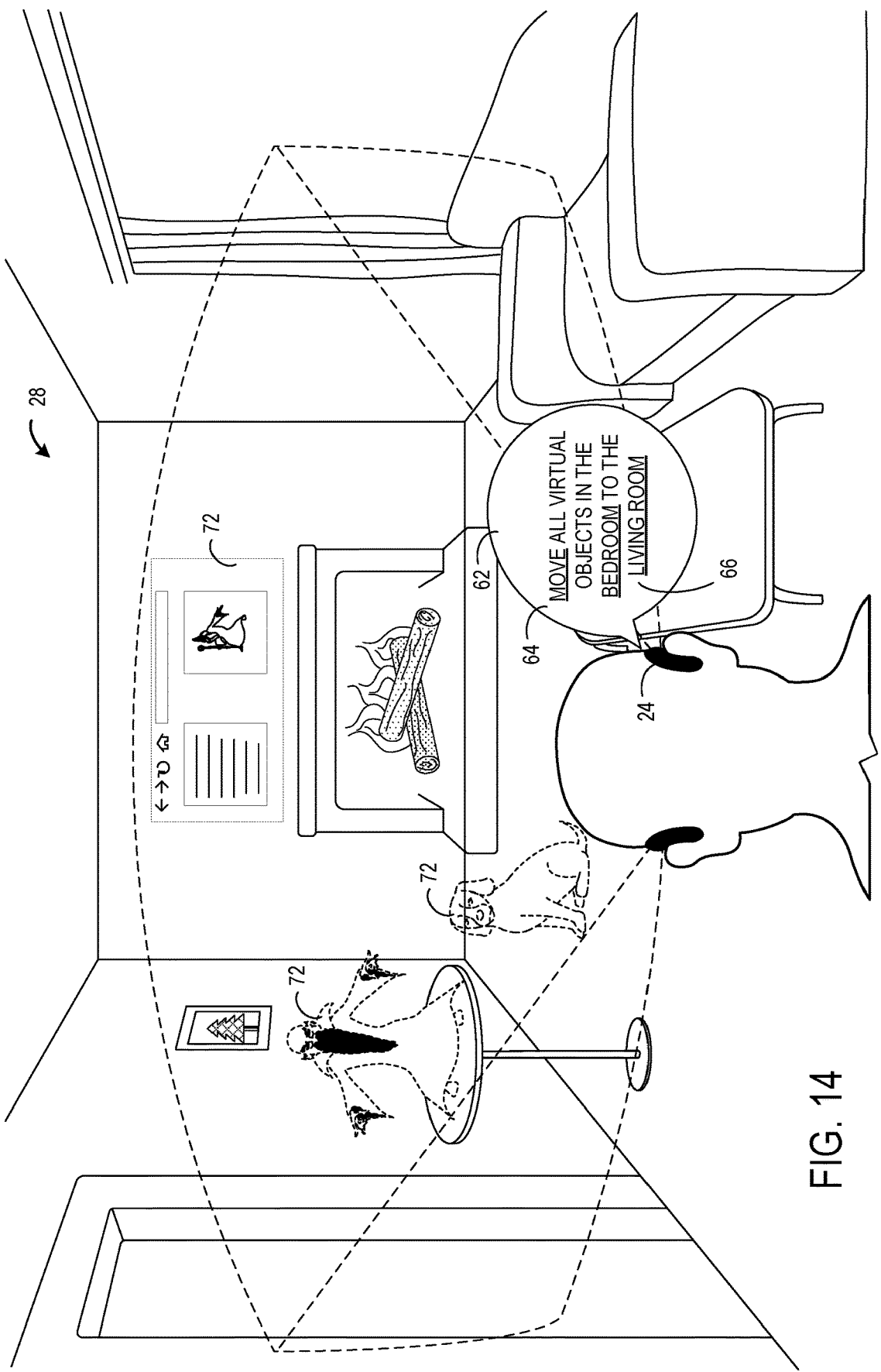
FIG. 14 shows an example move operation that has been performed on a plurality of target virtual objects for the computer device of FIG. 1.

The HMD device 24 may recognize the user specified operation 64 of the move operation based on the verb "move". The HMD device 24 may also identified the semantic tags of "bedroom" and "living room". Thus, based on the natural language input 62, the HMD device 24 may select each virtual object 56 that currently has a virtual location 60 that is associated with a physical location 58 of a bedroom physical object 46. Each of these virtual objects 56 may be selected as target virtual objects 72, and the HMD device 24 may perform the move operation on each of these target virtual objects 72 to update the virtual locations 60 of each of the target virtual objects 72 to a new virtual location 60 based on a physical location 58 of the target physical object 74, which is the living room in the example illustrated in FIG. 13. Additionally, it should be appreciated that none of the target virtual objects 72 are currently in a field of view of the HMD device 24, but may nonetheless be referenced using natural language inputs. As shown in FIG. 14, each of the target virtual objects 72 may be moved to the living room physical object and displayed at their updated virtual locations 60 in the living room.

Figure 15:
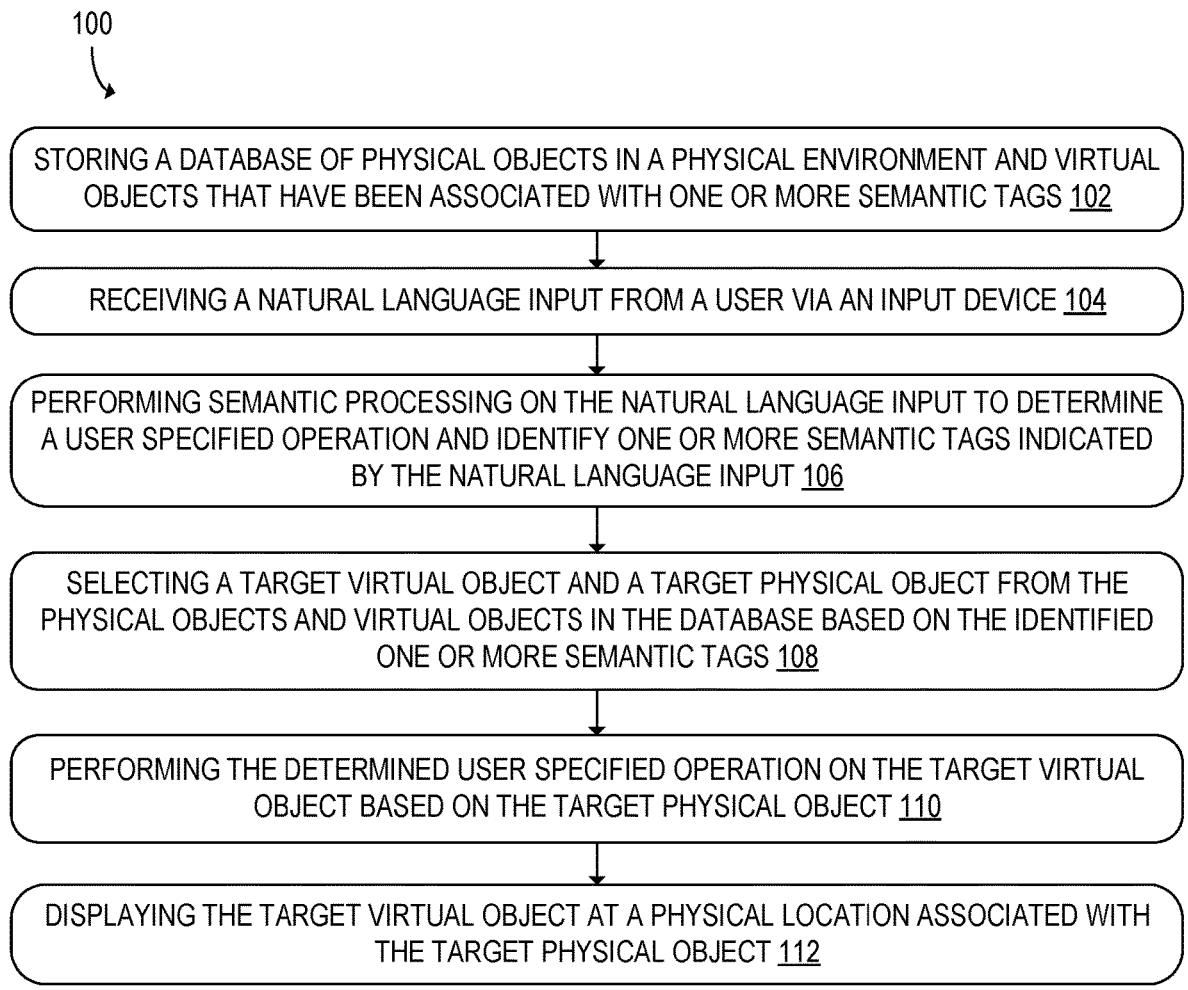
FIG. 15 shows a flowchart of an example method for performing user specified operations on virtual objects based on natural language inputs from a user implemented by the computer device of FIG. 1.

FIG. 15 shows a flowchart of a computer-implemented method 100. The method 100 may be implemented by the computer device 10 illustrated in FIG. 1. At step 102, the method 100 may include storing a database of physical objects in a physical environment and virtual objects that have been associated with one or more semantic tags. Methods and techniques for recognizing physical objects and determining semantic tags to associated with those physical objects will be discussed below with regard to FIG. 16. In one example, the physical objects that may be recognized and detected may include a room, a wall, a room furnishing, a table, a chair, a surface, physical location, a person, etc.

At 104, the method 100 may include receiving a natural language input from a user via an input device. In one example, the natural language input is a voice input received via an input device. However, in scenarios where voice input is not useable (e.g. noisy environment, broken microphone, etc.) or to provide affordance for users that are unable to effectively use voice commands such as users with a voice disability, method 100 may include receiving the natural language input via alternative input modalities. For example, the natural language input may take the form of a text input that is received via a physical keyboard or controller input device. As another example, the natural language input may be a text input received via a virtual keyboard or another type of GUI element that the user may interact with via gestures detected by the camera device 18.

At 106, the method 100 may include performing semantic processing on the natural language input to determine a user specified operation and identify one or more semantic tags indicated by the natural language input. As discussed above with regard to FIG. 1, to identify the user specified operation 64, the natural language processing module 42 may be configured to identify a verb in the natural language input 62, and compare the identified verb to the list of operations for virtual object 68. For example, the verbs "move", "transfer", "put", etc., may each be associated with a move operation. As another example, the verbs "open", "show", "start", etc., may each be associated with the application start operation. The natural language processing module 42 may be further configured to identify nouns of the natural language input as candidate semantic tags. The candidate semantic tags may by compared to the database stored at step 102 to determine whether there are virtual and physical objects that are associated with the candidate semantic tags.

At 108, the method 100 may include selecting a target virtual object and a target physical object from the physical objects and virtual objects in the database based on the identified one or more semantic tags. In one example, the target virtual object 72 and the target physical object 74 may be selected based on matches between the associated semantic tags 48 for the target virtual object and target physical object 74 and the identified semantic tags 66 in the natural language input 42.

At 110, the method 100 may include performing the determined user specified operation on the target virtual object based on the target physical object. In one example, the user specified operation may be a move operation, and step 110 may further include updating a location of the target virtual object in the physical environment based on the physical location associated with the target physical object. In another example, the user specified operation may be an application start operation, and step 110 may further include selecting a target application program from a plurality of application programs executable by the processor based on the identified one or more semantic tags, and generating a target virtual object associated with the target application program. It should be appreciated that other types of user specified operations may be performed on the target virtual object, such as, for example, a modification operation to modify a characteristic of the target virtual object.

At 112, the method 100 may include displaying the target virtual object at a physical location associated with the target physical object. The target virtual object may be displayed via a near-eye display device superimposed on the physical environment in an augmented-reality configuration. In one example, the physical location of the target physical object is outside of a field of view of a camera device of a head mounted display device. In this example, the target virtual object may not be displayed until a user changes a viewpoint of the head mounted display device and the physical location enters the field of view of the head mounted display device.

Figure 16:
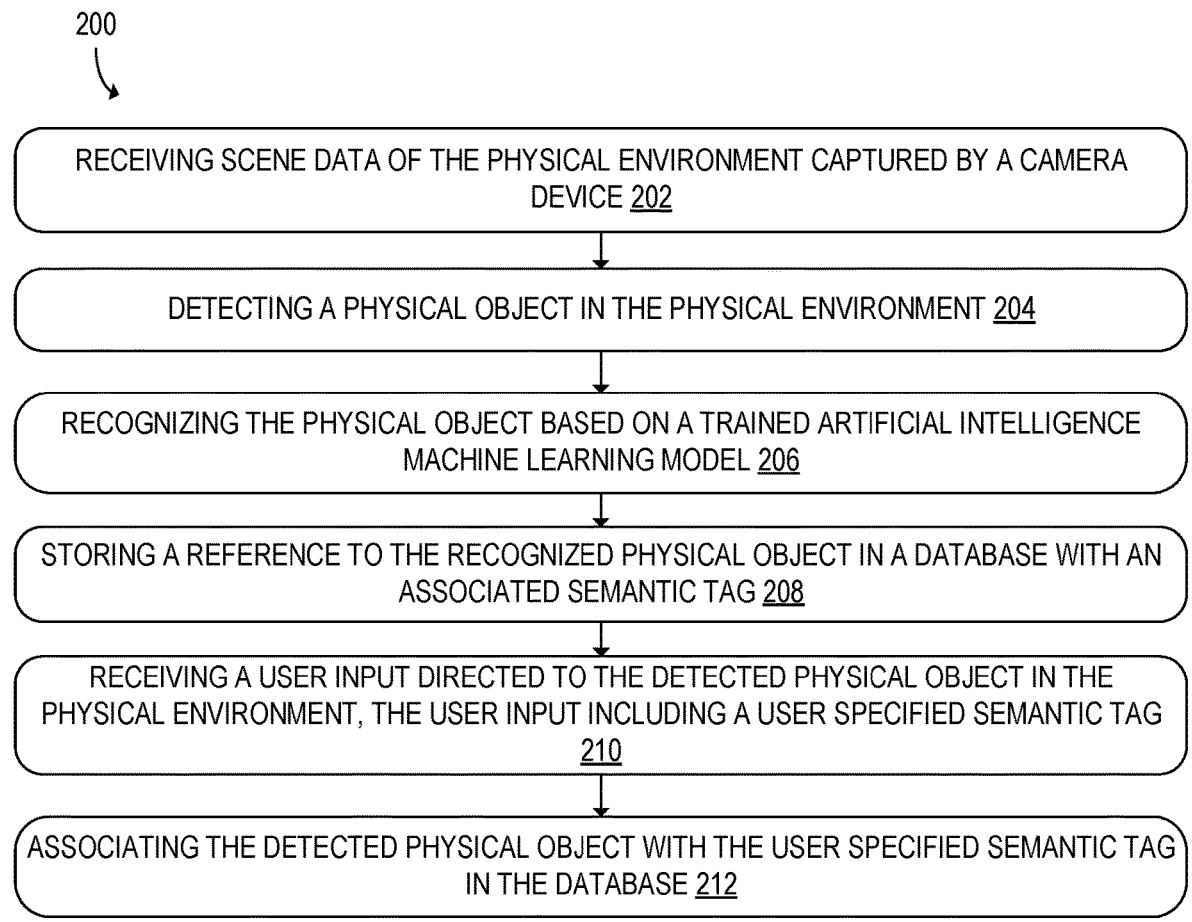
FIG. 16 shows a flowchart of an example method for associating semantic tags with physical object in a physical environment implemented by the computer device of FIG. 1.

FIG. 16 shows a flowchart of a computer-implemented method 200 for associating semantic tags with physical objects. The computer implemented method 200 may be implemented in real-time concurrently with the method 100 by the computer device 10 of FIG. 1. At 202, the method 200 may include receiving scene data of the physical environment captured by a camera device. The scene data may include RGB image data and depth data respectively captured by RGB and depth cameras.

At 204, the method 200 may include detecting a physical object in the physical environment. Physical objects may be detecting using a scene reconstruction and deconstruction pipeline described above with reference to FIG. 4. One example process is illustrated in FIG. 5 (A) which shows a portion of an example depth image centered at the physical table object 30E of the physical environment 28 of FIG. 3. The depth image is processed by surface reconstruction techniques at step (1) of the surface reconstruction and decomposition pipeline 44 to generate a geometric representation 46 of the physical environment 28. FIG. 5 (B) shows an example geometric representation 46 in the form of a surface mesh. At FIG. 5 (C), object boundaries of the geometric representation 46 of the table object have been identified, and a geometric representation of the table object 30E has been segmented into a detected object.

At 206, the method 200 may include recognizing the physical object based on a trained artificial intelligence machine learning model. In one example, the object detected at step 204 may be processed by the trained artificial intelligence learning model 40 to recognize the detected object based on different factors or characteristics of the object, such as, for example, geometric shape, size, color, surface texture, etc.

At 208, the method 200 may include storing a reference to the recognized physical object in the database with an associated semantic tag. The physical object may be re-found and tracked across successive updates to the scene data at the user moves around the physical environment, and corresponding data in the database such as, for example, a physical location and orientation of the tracking physical object may be updated.

At 210, the method 200 may include receiving a user input directed to the detected physical object in the physical environment, the user input including a user specified semantic tag. An example user input is illustrated in FIG. 6. In one example, the user input may be detected as being directed to a particular object based on a user indicated direction that may be determined based on a detected gaze direction and/or a detected gesture input.

At 212, the method 200 may include associating the detected physical object with the user specified semantic tag in the database. Both user specified semantic tags and artificial intelligence generated semantic tags may be associated with a particular physical object and stored in the database. In this manner, the database may be continuously updated in real-time according to the steps of method 200.

In some embodiments, the methods and processes described herein may be tied to a computing system of one or more computer devices. In particular, such methods and processes may be implemented as a computer-application program or service, an application-programming interface (API), a library, and/or other computer-program product.

Figure 17:
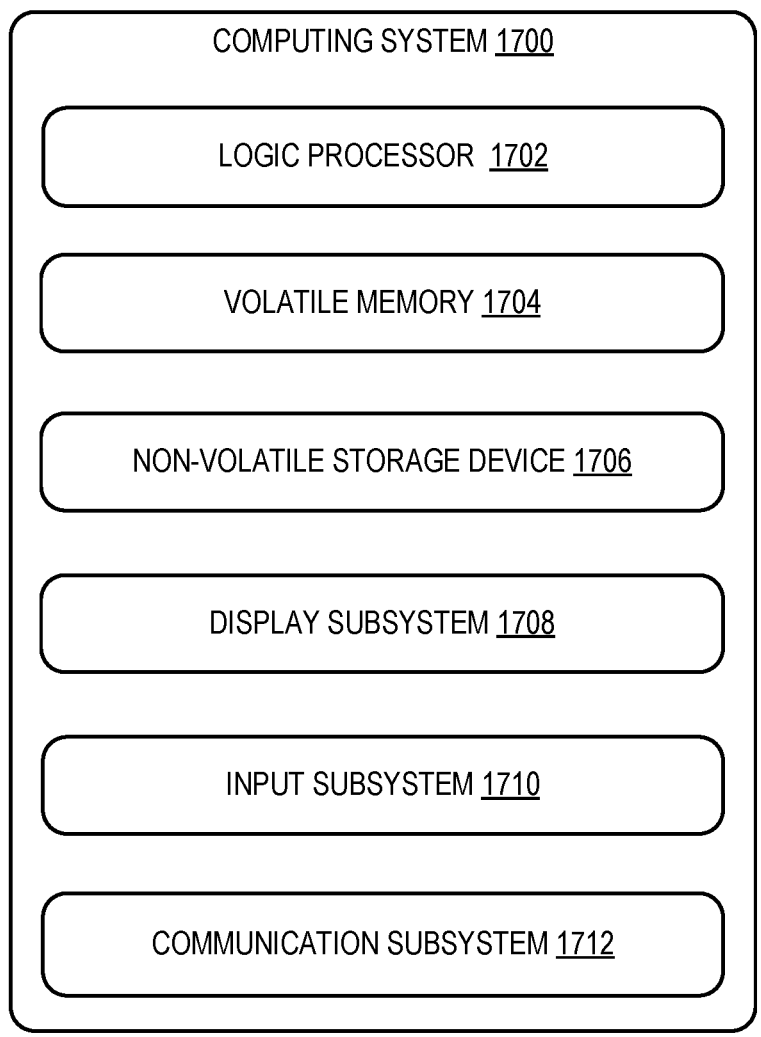
FIG. 17 shows a schematic view of an example computing environment in which the computer device of FIG. 1 may be enacted.

FIG. 17 schematically shows a non-limiting embodiment of a computing system 1700 that can enact one or more of the methods and processes described above. Computing system 1700 is shown in simplified form. Computing system 1700 may embody the computer device 10 described above and illustrated in FIG. 1. Computing system 1700 may take the form of one or more personal computers, server computers, tablet computers, home-entertainment computers, network computer devices, gaming devices, mobile computer devices, mobile communication devices (e.g., smart phone), and/or other computer devices, and wearable computer devices such as smart wristwatches and head mounted augmented reality devices.

Computing system 1700 includes a logic processor 1702 volatile memory 1704, and a non-volatile storage device 1706. Computing system 1700 may optionally include a display subsystem 1708, input subsystem 1710, communication subsystem 1712, and/or other components not shown in FIG. 17.

Logic processor 1702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computer devices configured in a cloud-computing configuration. In such a case, these virtualized aspects are run on different physical logic processors of various different machines, it will be understood.

Non-volatile storage device 1706 includes one or more physical devices configured to hold instructions executable by the logic processors to implement the methods and processes described herein. When such methods and processes are implemented, the state of non-volatile storage device 1706 may be transformed—e.g., to hold different data.

Non-volatile storage device 1706 may include physical devices that are removable and/or built-in. Non-volatile storage device 1706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1706 may include nonvolatile, dynamic, static, read/write, read-only, sequential-access, location-addressable, file-addressable, and/or content-addressable devices. It will be appreciated that non-volatile storage device 1706 is configured to hold instructions even when power is cut to the non-volatile storage device 1706.

Volatile memory 1704 may include physical devices that include random access memory. Volatile memory 1704 is typically utilized by logic processor 1702 to temporarily store information during processing of software instructions. It will be appreciated that volatile memory 1704 typically does not continue to store instructions when power is cut to the volatile memory 1704.

Aspects of logic processor 1702, volatile memory 1704, and non-volatile storage device 1706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1700 typically implemented in software by a processor to perform a particular function using portions of volatile memory, which function involves transformative processing that specially configures the processor to perform the function. Thus, a module, program, or engine may be instantiated via logic processor 1702 executing instructions held by non-volatile storage device 1706, using portions of volatile memory 1704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1708 may be used to present a visual representation of data held by non-volatile storage device 1706. The visual representation may take the form of a graphical user interface (GUI). As the herein described methods and processes change the data held by the non-volatile storage device, and thus transform the state of the non-volatile storage device, the state of display subsystem 1708 may likewise be transformed to visually represent changes in the underlying data. Display subsystem 1708 may include one or more display devices utilizing virtually any type of technology. Such display devices may be combined with logic processor 1702, volatile memory 1704, and/or non-volatile storage device 1706 in a shared enclosure, or such display devices may be peripheral display devices.

When included, input subsystem 1710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1712 may be configured to communicatively couple various computer devices described herein with each other, and with other devices. Communication subsystem 1712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1700 to send and/or receive messages to and/or from other devices via a network such as the Internet.

The following paragraphs provide additional support for the claims of the subject application. One aspect provides a head mounted display device comprising a display device configured to display virtual objects at locations in a physical environment, a camera device configured to capture images of the physical environment, an input device configured to receive a user input. and a processor. The processor is configured to store a database of physical objects and virtual objects that have been associated with one or more semantic tags. The processor is further configured to receive a natural language input from a user via the input device, and perform semantic processing on the natural language input to determine a user specified operation and identify one or more semantic tags indicated by the natural language input. The processor is further configured to select a target virtual object and a target physical object from the physical objects and virtual objects in the database based on the identified one or more semantic tags, perform the determined user specified operation on the target virtual object based on the target physical object, and display the target virtual object at a physical location associated with the target physical object. In this aspect, additionally or alternatively, the physical objects may be selected from the group consisting of a room, a wall, a room furnishing, a table, a chair, a surface, physical location, and a person. In this aspect, additionally or alternatively, the physical location of the target physical object may be outside of a field of view of the camera device of the head mounted display device. In this aspect, additionally or alternatively, the natural language input may be a voice input received via the input device. In this aspect, additionally or alternatively, the determined user specified operation may be a move operation, and to perform the determined user specified operation, the processor may be further configured to update a location of the target virtual object in the physical environment based on the physical location associated with the target physical object, and display the target virtual object at the updated location via the display device. In this aspect, additionally or alternatively, the determined user specified operation may be an application start operation, and to perform the determined user specified operation, the processor may be further configured to select a target application program from a plurality of application programs executable by the processor based on the identified one or more semantic tags, generate a target virtual object associated with the target application program, and display the generated target virtual object at a virtual location based on the physical location associated with the target physical object. In this aspect, additionally or alternatively, the processor may be further configured to determine a user indicated direction for a user of the head mounted display device, and select the target virtual object or the target physical object further based on the determined user indicated direction. In this aspect, additionally or alternatively, the user indicated direction may be determined based on a detected gaze direction of the user or a detected hand gesture of the user. In this aspect, additionally or alternatively, the head mounted display device may further include a deep neural network processor configured to receive scene data of the physical environment captured by the camera device, detect a physical object in the physical environment, recognize the physical object based on a trained artificial intelligence machine learning model, and store a reference to the recognized physical object in the database with an associated semantic tag. In this aspect, additionally or alternatively, the processor may be further configured to receive a user input directed to the detected physical object in the physical environment, the user input including a user specified semantic tag, and associate the detected physical object with the user specified semantic tag in the database. In this aspect, additionally or alternatively, the processor may be further configured to determine a confidence value for the selection of the target virtual object or the target physical object, and based on determining that the confidence value is below a threshold value, present a query to the user for a user confirmation of the selection of the target virtual object or the target physical object.

Another aspect provides a method comprising, at a processor, storing a database of physical objects in a physical environment and virtual objects that have been associated with one or more semantic tags, receiving a natural language input from a user via an input device, and performing semantic processing on the natural language input to determine a user specified operation and identify one or more semantic tags indicated by the natural language input. The method further comprises selecting a target virtual object and a target physical object from the physical objects and virtual objects in the database based on the identified one or more semantic tags, performing the determined user specified operation on the target virtual object based on the target physical object, and displaying the target virtual object at a physical location associated with the target physical object. In this aspect, additionally or alternatively, the physical objects may be selected from the group consisting of a room, a wall, a room furnishing, a table, a chair, a surface, physical location, and a person. In this aspect, additionally or alternatively, the physical location of the target physical object may be outside of a field of view of a camera device of a head mounted display device that includes the processor. In this aspect, additionally or alternatively, the natural language input may be a voice input received via an input device. In this aspect, additionally or alternatively, the determined user specified operation may be a move operation, and performing the determined user specified operation may further comprises updating a location of the target virtual object in the physical environment based on the physical location associated with the target physical object, and displaying the target virtual object at the updated location via the display device. In this aspect, additionally or alternatively, the determined user specified operation may be an application start operation, and performing the determined user specified operation may further comprise selecting a target application program from a plurality of application programs executable by the processor based on the identified one or more semantic tags, generating a target virtual object associated with the target application program, and displaying the generated target virtual object at a virtual location based on the physical location associated with the target physical object. In this aspect, additionally or alternatively, the method may further comprise receiving scene data of the physical environment captured by a camera device, detecting a physical object in the physical environment, recognizing the physical object based on a trained artificial intelligence machine learning model, and storing a reference to the recognized physical object in the database with an associated semantic tag. In this aspect, additionally or alternatively, the method may further comprise receiving a user input directed to the detected physical object in the physical environment, the user input including a user specified semantic tag, and associating the detected physical object with the user specified semantic tag in the database.

Another aspect provides a computer device comprising, a display device configured to display virtual objects at locations in a physical environment, a camera device configured to capture images of the physical environment, an input device configured to receive a user input, and a processor. The processor is configured to receive a natural language input from a user via the input device, and perform semantic processing on the natural language input to determine a user specified operation and identify one or more semantic tags indicated by the natural language input. The processor is further configured to select a target virtual object and a target physical object based on the identified one or more semantic tags, perform the determined user specified operation on the target virtual object based on the target physical object, and display the target virtual object via the display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A head mounted display device comprising:
a display device configured to display virtual objects at locations in a physical environment;
a camera device configured to capture images of the physical environment;
an input device configured to receive a user input; and
a processor configured to:
generate a three-dimensional model of the physical environment based on the images captured by the camera device;

recognize a physical object in the physical environment based on a trained artificial intelligence machine learning model;

determine an associated semantic tag for the recognized physical object and a physical object location in the three-dimensional model of the physical environment;

store data for the recognized physical object including the associated semantic tag and the physical object location in a database of physical objects and virtual objects, wherein each physical object in the database is associated with a respective semantic tag and physical object location in the three-dimensional model of the physical environment, and wherein each virtual object is associated with a respective semantic tag and virtual object location in the three-dimensional model of the physical environment;

receive a natural language input from a user via the input device;

perform semantic processing on the natural language input to determine a user specified operation and identify one or more semantic tags indicated by the natural language input, the determined user specified operation including a move operation;

select a target virtual object having a current virtual object location from the database based on the identified one or more semantic tags, and a target physical object having a target physical object location from the database based on the identified one or more semantic tags, wherein the target physical object location is outside a field of view of the camera device of the head mounted display device;

perform the determined user specified operation including the move operation on the target virtual object based on the target physical object, wherein performing the move operation includes moving the target virtual object from the current virtual object location of the target virtual object to the target physical object location of the target physical object; and display the target virtual object at the target physical object location associated with the target physical object.

2. The head mounted display device of claim 1, wherein the physical objects are selected from the group consisting of a room, a wall, a room furnishing, a table, a chair, a surface, physical location, and a person.

3. The head mounted display device of claim 1, wherein the current virtual object location of the target virtual object is outside of a field of view of the camera device of the head mounted display device.

4. The head mounted display device of claim 1, wherein the natural language input is a voice input received via the input device.

5. The head mounted display device of claim 1, wherein the determined user specified operation includes an application start operation, and to perform the determined user specified operation the processor is further configured to:

select a target application program from a plurality of application programs executable by the processor based on the identified one or more semantic tags;

generate the target virtual object associated with the target application program in the database;

update a virtual object location of the generated target virtual object to the target physical object location of the target physical object; and display the generated target virtual object at the updated virtual object location.

6. The head mounted display device of claim 1, wherein the processor is further configured to:

determine a user indicated direction for a user of the head mounted display device; and select the target virtual object or the target physical object further based on the determined user indicated direction.

7. The head mounted display device of claim 6, wherein the user indicated direction is determined based on a detected gaze direction of the user or a detected hand gesture of the user.

8. The head mounted display device of claim 1, further comprising a deep neural network processor configured to implement the trained artificial intelligence machine learning model.

9. The head mounted display device of claim 1, wherein the processor is further configured to:

receive a user input directed to a user specified physical object in the physical environment, the user input including a user specified semantic tag; and associate the user specified physical object with the user specified semantic tag in the database.

10. The head mounted display device of claim 1, wherein the processor is further configured to:

determine a confidence value for the selection of the target virtual object or the target physical object; and based on determining that the confidence value is below a threshold value, present a query to the user for a user confirmation of the selection of the target virtual object or the target physical object.

11. A method comprising:

at a processor:

generating a three-dimensional model of a physical environment based on images captured by a camera device;

recognizing a physical object in the physical environment based on a trained artificial intelligence machine learning model;

determining an associated semantic tag for the recognized physical object and a physical object location in the three-dimensional model of the physical environment;

storing data for the recognized physical object including the associated semantic tag and the physical object location in a database of physical objects in a physical environment and virtual objects, wherein each physical object in the database is associated with a respective semantic tag and physical object location in the three-dimensional model of the physical environment, and wherein each virtual object is associated with a respective semantic tag and virtual object location in the three-dimensional model of the physical environment;

receiving a natural language input from a user via an input device;

performing semantic processing on the natural language input to determine a user specified operation and identify one or more semantic tags indicated by the natural language input, the determined user specified operation including a move operation;

selecting a target virtual object having a current virtual object location from the database based on the identified one or more semantic tags, and a target physical object having a target physical object location from the database based on the identified one or more semantic tags, wherein the target physical object location is outside a field of view of the camera device of the head mounted display device;

performing the determined user specified operation including the move operation on the target virtual object based on the target physical object, wherein performing the move operation includes moving the target virtual object from the current virtual object location of the target virtual object to the target physical object location of the target physical object; and displaying the target virtual object at the target physical object location associated with the target physical object.

12. The method of claim 11, wherein the physical objects are selected from the group consisting of a room, a wall, a room furnishing, a table, a chair, a surface, physical location, and a person.

13. The method of claim 11, wherein the current virtual object location of the target virtual object is outside of a field of view of a camera device of a head mounted display device that includes the processor.

14. The method of claim 11, wherein the natural language input is a voice input received via an input device.

15. The method of claim 11, wherein the determined user specified operation includes an application start operation, and performing the determined user specified operation further comprises:

selecting a target application program from a plurality of application programs executable by the processor based on the identified one or more semantic tags;

generating the target virtual object associated with the target application program in the database;

updating a virtual object location of the generated target virtual object to the target physical object location of the target physical object; and displaying the generated target virtual object at the updated virtual object location.

16. The method of claim 11, further comprising implementing the trained artificial intelligence machine learning model at a deep neural network processor.

17. The method of claim 11, further comprising:

receiving a user input directed to a user specified physical object in the physical environment, the user input including a user specified semantic tag; and associating the user specified physical object with the user specified semantic tag in the database.

18. A computer device comprising:

a display device configured to display virtual objects at locations in a physical environment;

a camera device configured to capture images of the physical environment;

an input device configured to receive a user input; and a processor configured to:

generate a three-dimensional model of the physical environment based on the images captured by the camera device;

recognize a physical object in the physical environment based on a trained artificial intelligence machine learning model;

determine an associated semantic tag for the recognized physical object and a physical object location in the three-dimensional model of the physical environment;

store data for the recognized physical object including the associated semantic tag and the physical object location in a database of physical objects and virtual objects, wherein each physical object in the database is associated with a respective semantic tag and physical object location in the three-dimensional model of the physical environment, and wherein each virtual object is associated with a respective semantic tag and virtual object location in the three-dimensional model of the physical environment;

receive a natural language input from a user via the input device;

perform semantic processing on the natural language input to determine a user specified operation and identify one or more semantic tags indicated by the natural language input, the determined user specified operation including a move operation;

select a target virtual object having a current virtual object location from the database based on the identified one or more semantic tags, and a target physical object having a target physical object location from the database based on the identified one or more semantic tags, wherein the current virtual object location is outside a field of view of the camera device of the head mounted display device;

perform the determined user specified operation including the move operation on the target virtual object based on the target physical object, wherein performing the move operation includes moving the target virtual object from the current virtual object location of the target virtual object to the target physical object location of the target physical object; and display the target virtual object via the display device.

19. The computer device of claim 18, wherein the target physical object location of the target physical object is outside of a field of view of a camera device of a head mounted display device that includes the processor.

20. The computer device of claim 18, wherein the processor is further configured to:

determine a confidence value for the selection of the target virtual object or the target physical object; and based on determining that the confidence value is below a threshold value, present a query to the user for a user confirmation of the selection of the target virtual object or the target physical object.

* * * * *